United States Patent
Takahashi

(10) Patent No.: US 7,196,315 B2
(45) Date of Patent: Mar. 27, 2007

(54) ECCENTRIC OPTICAL SYSTEM AND OPTICAL APPARATUS USING SAME

(75) Inventor: Koichi Takahashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 232 days.

(21) Appl. No.: 10/852,677

(22) Filed: May 25, 2004

(65) Prior Publication Data

US 2005/0018321 A1    Jan. 27, 2005

(30) Foreign Application Priority Data

May 26, 2003    (JP)    .............................. 2003-147588

(51) Int. Cl.
*H01J 3/14*    (2006.01)
*G02B 27/10*    (2006.01)

(52) U.S. Cl. ...................... 250/216; 359/638; 359/639; 359/640; 359/834

(58) Field of Classification Search ................ 250/216, 250/208.1; 359/629, 638–640, 833, 834; 396/272, 276, 384
See application file for complete search history.

(56) References Cited

U.S. PATENT DOCUMENTS

| | | | |
|---|---|---|---|
| 4,265,510 A | 5/1981 | Cook | |
| 4,834,517 A | 5/1989 | Cook | |
| 5,991,103 A | 11/1999 | Togino | |
| 6,128,144 A * | 10/2000 | Togino | ........................ 359/728 |
| 6,249,391 B1 | 6/2001 | Hayakawa et al. | |
| 6,324,012 B1 * | 11/2001 | Aratani et al. | .............. 359/627 |
| 2003/0063400 A1 | 4/2003 | Sunaga et al. | |

FOREIGN PATENT DOCUMENTS

| | | |
|---|---|---|
| JP | 07-146442 | 6/1995 |
| JP | 2000-199852 | 7/2000 |

\* cited by examiner

*Primary Examiner*—Thanh X. Luu
*Assistant Examiner*—Stephen Yam
(74) *Attorney, Agent, or Firm*—Pillsbury Winthrop Shaw Pittman, LLP

(57) ABSTRACT

An eccentric optical system forming an optical path where an incident light beam is internally reflected three times to fold the optical path, and then emitted from a transmission surface and imaged on an image surface, and an optical path where the incident light beam is internally reflected two times to fold the optical path, and then emitted from a branching surface and imaged on an image surface. At least two surfaces of the optical operating surfaces are rotationally asymmetric surfaces.

20 Claims, 6 Drawing Sheets

ECCENTRIC OPTICAL SYSTEM AND OPTICAL APPARATUS USING SAME

BACKGROUND OF THE INVENTION

Priority is claimed on Japanese Patent Application No. 2003-147588, filed May 26, 2003, the content of which is incorporated herein by reference.

1. Field of the Invention

The present invention relates to an eccentric optical system and an optical apparatus using the eccentric optical system. In particular, the invention relates to an eccentric optical system and an optical apparatus using the eccentric optical system, that can be employed appropriately when focusing on a focal plane.

2. Description of Related Art

It is well known that, depending upon the field of application, catoptric systems conventionally have superior characteristics in comparison to dioptric systems.

The advantages of catoptric systems, are that, since chromatic aberration does not occur, provided reflective materials and reflective coatings are permitted by reflection spectroscopy characteristics, an extremely wide range can be covered, the optical path can be folded and the overall optical apparatus can readily be of compact configuration, and provided the curvature is the same, power is increased by a factor of four so that the curvature can be small, thus controlling the occurrence of aberration, and the like.

Catoptric systems are employed in such fields as astronomy and the like, wherein catoptric systems such as Cassegrain and Gregorian types and the like employing a combination of primary and secondary mirrors are well-known. However since these mirrors are positioned on the same axis, the secondary mirror part is shielded, resulting in a light loss.

To improve this point, a variety of catoptric systems being eccentric optical systems of a type employing a combination of a plurality of reflection surfaces mutually eccentric and inclined have been designed. As an example of such a catoptric system, a system having a plurality of reflective mirrors is disclosed in patent documents 1 through 4.

On the other hand, a variety of catoptric systems being a prism type of eccentric optical system wherein a plurality of reflection surfaces are mutually eccentric and inclined have been designed (for example, patent documents 5 and 6).

These eccentric systems are employed as optical apparatus in combination with photodetectors and the like.

[Patent Document 1]
Japanese Unexamined Patent Application, First Publication No. Hei 7-146442 (FIG. 2)
[Patent Document 2]
Japanese Unexamined Patent Application, First Publication No. 2000-199852 (FIGS. 1 and 4)
[Patent Document 3]
U.S. Pat. No. 4,265,510 (FIGS. 1 and 3)
[Patent Document 4]
U.S. Pat. No. 4,834,517 (FIGS. 2, 4, and 6)
[Patent Document 5]
Japanese Unexamined Patent Application, First Publication No. Hei 8-122670 (pages 3 to 5, FIGS. 3, 4, and 6)
[Patent Document 6]
Japanese Unexamined Patent Application, First Publication No. 2000-321500 (pages 12 to 14, FIGS. 1 to 12)

With the technology disclosed in patent documents 1 through 4, a plurality of reflective mirrors having surface reflection surfaces is employed in combination. Therefore, in order for each reflection surface to be positioned accurately, it is necessary to machine the relative position of the peripheral part of each reflective mirror and the reflection surface, with high accuracy. Furthermore, it is necessary to position each reflective mirror accurately in relation to the others. During assembly, therefore, an extremely accurate positioning technique, or a positioning mechanism, is necessary to adjust the position of each reflective mirror. As a result, except for the manufacture of optical components, costs are incurred in assembly and adjustment.

Moreover, with the technology disclosed in patent documents 5 and 6, the prism is provided with an incident surface, an emission surface of a transmission surface, and two or three reflection surfaces, and is configured so that the input light is reflected within the prism, and an image is formed after its emission from the prism. At this time, the optical paths within the prism intersect in a triangular shape due to reflection from to the reflection surfaces.

In such cases, the optical paths within the prism intersect in a triangular shape at the point of intersection of the optical axes and the two points of reflection, folding the optical path, and thus permitting a certain degree of miniaturization. In practice, for example, when configuring an optical apparatus having a large incident aperture and a long focal distance, the length of the optical path itself is increased, and back-focus becomes longer.

SUMMARY OF THE INVENTION

A first aspect of an eccentric optical system of the present invention having an approximately parallel input light beam, and including a prism having a medium with a refractive index of one or more, on which at least four optical operating surfaces are formed at the boundary surface of the medium, wherein assuming the optical operating surfaces are referred to as a first, second, third, fourth, . . . , and n-th ("n" is a natural number) surface along an optical path of the input light, at least one surface of the first through fourth surfaces is a branching surface wherein the optical path is branched into two optical paths for transmitted light and reflected light.

A second aspect of an eccentric optical system of the present invention having an approximately parallel input light beam, and including a prism having a medium with a refractive index of one or more, on which five optical operating surfaces are formed at the boundary surface of the medium, wherein the five optical operating surfaces are positioned so that, assuming the five optical operating surfaces are referred to as a first, second, third, fourth, and fifth surface in that order along the optical path of the input light, at least one surface of the first through fifth surfaces is a branching surface wherein the optical path is branched into two optical paths for transmitted light and reflected light, and a true image is formed in each of the optical paths branched at the branching surface.

In the second aspect of an eccentric optical system, assuming the five optical operating surfaces are referred to as a first, second, third, fourth, and fifth surfaces in that order along the optical path of the input light, the first surface may be a transmission surface which transmits the input light, the second surface and the third surface may be internal reflection surfaces which reflect the light beam passing inside the median inside the medium, the fourth surface may be a branching surface which branches the optical path into two optical paths of transmitted light and reflected light, the fifth surface may be a transmission surface which transmits the reflected light reflected by the fourth surface, and at least two surfaces of these five optical operating surfaces may be rotationally asymmetric surfaces, and at least one true image may be formed outside the prism.

In the first aspect of an eccentric optical system, the second surface may include a rotationally asymmetric surface having a positive power.

In the first aspect of an eccentric optical system, the third surface may include a rotationally asymmetric surface having a negative power.

In the first aspect of an eccentric optical system, an optical path may be formed wherein the primary light beam on the axis of the reflected light reflected by the branching surface intersects with the primary light beam on the axes of at least two light beams passing through the prism.

In the second aspect of an eccentric optical system, an optical path may be formed wherein the primary light beam reflected by the second surface towards the third surface on the axis, and the primary light beam reflected by the fourth surface towards the fifth surface on the axis, each intersect the primary light beam transmitted through the first surface towards the second surface on the axis.

In the second aspect of an eccentric optical system, an arrangement of the first through fifth surfaces in the peripheral direction of the prism may be such that at least one surface between the first surface and the second surface, between the second surface and the third surface, between the third surface and the fourth surface, and between the fourth surface and the fifth surface, is provided with another optical operating surface.

In the second aspect of an eccentric optical system, when, with a plane orthogonal to the primary light beam on the axis of the input light as an inclined datum surface, the angle of inclination of a tangential plane at a position intersecting the primary light beam on the axis on the second surface is θ1, and the angle of inclination of a tangential plane at a position intersecting the primary light beam on the axis on the third surface is θ2, the following conditional expression may be satisfied:

$$30° \leq |θ2-θ1| \leq 80°$$

In the second aspect of an eccentric optical system, when, with a plane orthogonal to the primary light beam on the axis of the input light as an inclined datum surface, the angle of inclination of a tangential plane at a position intersecting the primary light beam on the axis on the fourth surface is θ3, and the angle of inclination of a tangential plane at a position intersecting the primary light beam on the axis on the fifth surface is θ4, the following conditional expression is satisfied:

$$|θ4-θ3| \leq 30°$$

In the first aspect of an eccentric optical system, when a paraxial focal distance is assumed as F, the following conditional expression may be satisfied:

$$60(mm) \leq F \leq 500(mm)$$

In the first aspect of an eccentric optical system, when a paraxial focal distance is assumed as F, and an incident aperture diameter is assumed as D, a ratio F/D satisfies the following conditional expression:

$$2 \leq F/D \leq 15$$

In the first aspect of an eccentric optical system, there may be provided an optical device which forms a light beam after formation of a true image outside the prism, into an approximately parallel light beam, and has a positive power which forms an emitting aperture at a required position.

In this case, a light-condensing device which images the light beam after formation of the emitting aperture may be provided onto the light receiving surface.

In the first aspect of an eccentric optical system, of the five optical operating surfaces, at least one surface is a branching surface wherein the optical path is branched into two optical paths for transmitted light and reflected light, and a true image is formed in each of the optical paths branched at the branching surface.

In the second aspect of an eccentric optical system, assuming the five optical operating surfaces are referred to as the first, second, third, fourth, and fifth surfaces along the optical path of the input light, the branching surface may be provided as the fourth surface, and a primary light beam reflected by the fourth surface towards the fifth surface on the axis may form an optical path intersecting with a primary light beam transmitted through the first surface towards the second surface on the axis, and a primary light beam reflected by the second surface towards the third surface on the axis.

An optical apparatus of the present invention wherein the input light is an approximately parallel light beam, including: a light-condensing unit having the eccentric optical system, and a light-deflecting device which deflects a light beam forming the emitting aperture in the eccentric optical system, in the vicinity of the position of the emitting aperture, and guides it to one of the light receiving surfaces; a position detection device which detects a light receiving position of the light beam guided to the one of light receiving surface and outputs a detection signal; a movement mechanism which movably holds the light-condensing unit; and a position control device which controls the amount of movement of the movement mechanism in response to the detection output from the position detection device, or an amount of deflection of the light-deflecting device, or both.

The movement mechanism may be provided with a gimbal stage.

An actual aperture of the eccentric optical system may be integrated with an exterior of the light-condensing unit.

The position detection device may be provided in one light receiving surfaces, and in another light receiving surfaces, and the position control device may provides coarse movement of the movement mechanism in response to one detection output from the position detection device, and fine movement of the movement mechanism in response to another detection output of the position detection device.

The position detection device may be provided with a modulating photodetector device which constitutes a light receiving part in transmission of optical signals through space.

A first aspect of an optical apparatus of the present invention, used for spacial optical communications, including an optical operating surface positioned eccentrically.

A second aspect of an optical apparatus of the present invention, used for spacial optical communications, including a prism having a medium with a refractive index of one or more, on which at least four optical operating surfaces are eccentrically formed at the boundary surface of the medium.

In the second aspect of an optical apparatus, at least the four optical operating surfaces may be positioned in a positional relationship so that, assuming the optical operating surfaces are referred to as a first second, third, fourth, . . . , and n-th ("n" is a natural number) surface along an optical path of the input light, a primary light beam reflected by the third surface towards the fourth surface on the axis intersects a primary light beam transmitted through the first surface towards the second surface on the axis In the first aspect of an optical apparatus, at least one surface of the optical operating surfaces may be a branching surface wherein the optical path is branched into two optical paths for transmitted light and reflected light.

In the first aspect of an optical apparatus, the optical operating surface positioned eccentrically may include rotationally asymmetric surfaces.

A first aspect of an optical apparatus for spacial optical communications of the present invention, including a photodetector positioned at a position of an image of the optical apparatus according to Claim 22.

A second aspect of an optical apparatus for spacial optical communications of the present invention, including a photodetector positioned at a position of an image of the eccentric optical system according to Claim 1

DETAILED DESCRIPTION OF THE INVENTION

The following explains embodiments of the present invention with reference to the appended drawings. In all drawings, the same reference symbols are assigned to the same or equivalent members, even in cases in which the embodiments differ, and common explanations are omitted.

First Embodiment

The following explains an eccentric optical system of a first embodiment of the present invention.

Figure 1A:
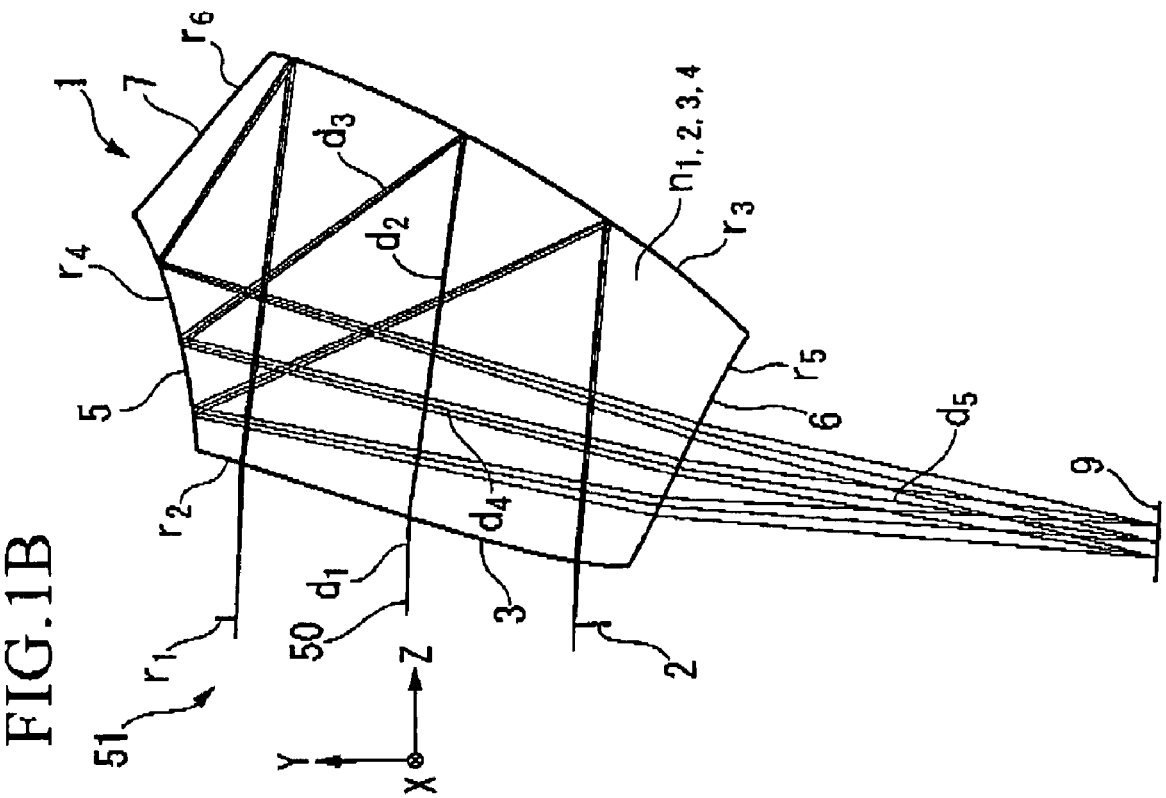
FIGS. 1A and 1B are section drawings explaining the shape of a prism being an eccentric optical system, and an example of an optical path, according to a first embodiment of the present invention.
Figure 1B:
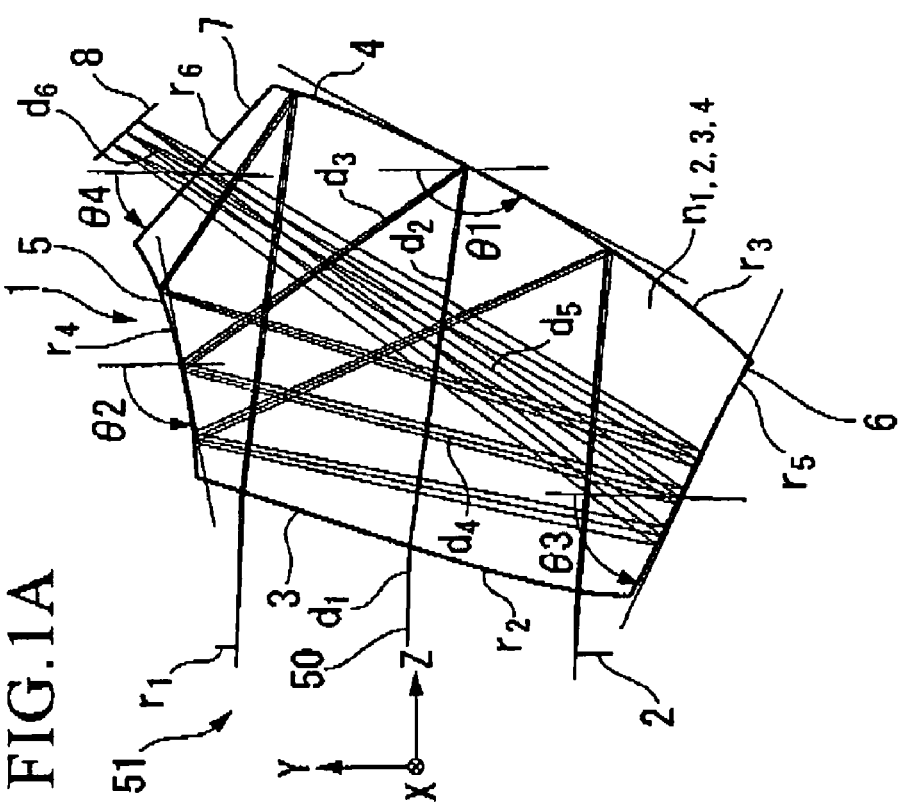
Figure 2:
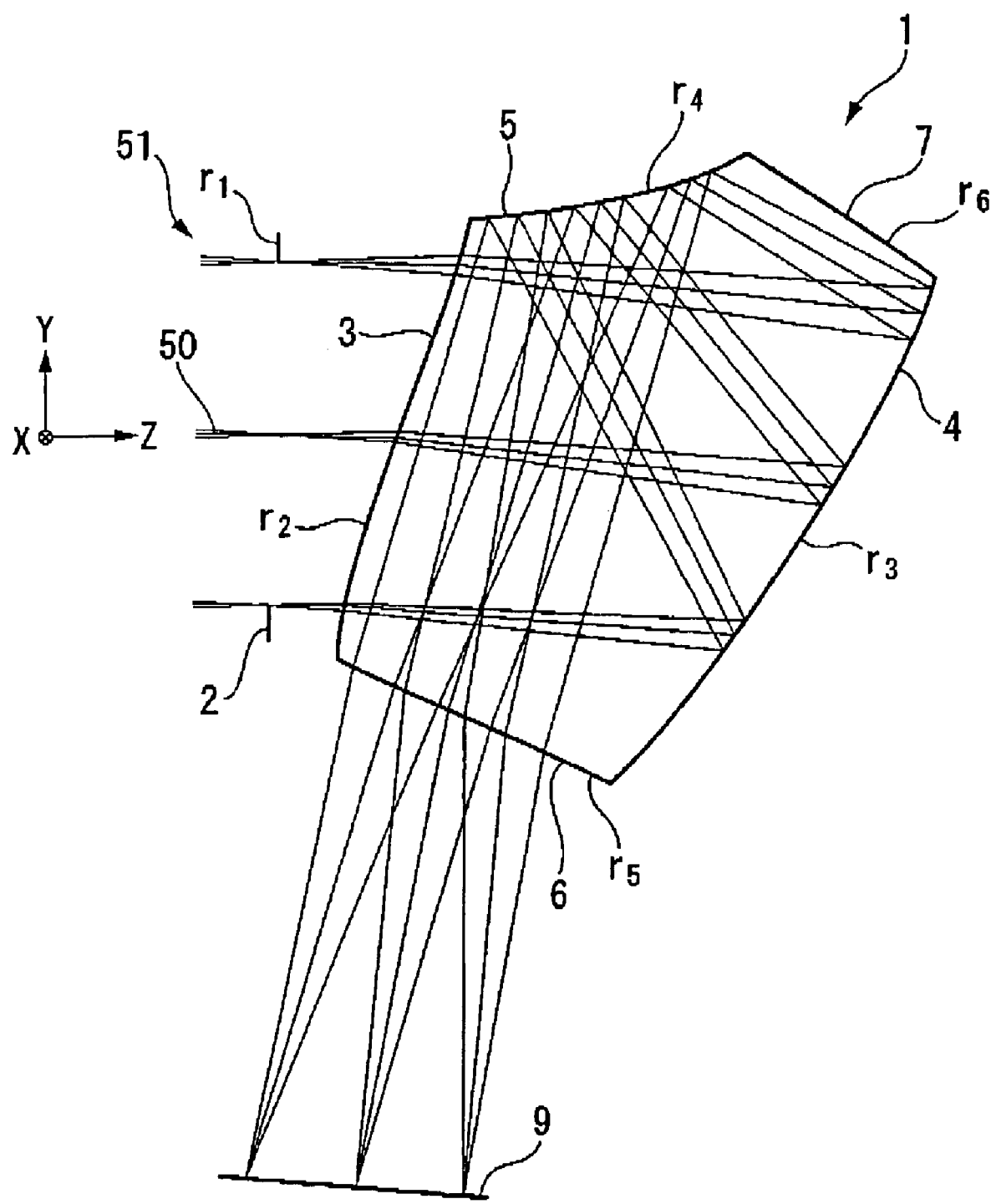
FIG. 2 is a section drawing explaining the optical path when an incident field angle is changed in the same embodiment.

FIG. 1A and FIG. 1B are section drawings explaining the shape of a prism being an eccentric optical system, and an example of an optical path, according to a first embodiment of the present invention. FIG. 2 is a section drawing explaining the optical path when an incident field angle is changed in the same embodiment.

The following explains the prism 1 being the optical apparatus according to the first embodiment of the present invention.

The prism 1 accepts an approximately parallel incident light beam and forms an image on the exterior, and is formed from a medium having a refractive index of one or more. Glass or synthetic resin and the like can be employed as this medium.

Five optical operating surfaces, namely; a transmission surface 3, a reflection surface 4 (internal reflection surface), a reflection surface 5 (internal reflection surface), a branching surface 6, and a transmission surface 7, are provided. If the curvature of each optical operating surface is ignored, the prism 1 is an approximate column of five-sided section.

FIG. 1A shows a section including the primary light beam on the axis when an approximately parallel incident light beam 51 (input light) is incident to the transmission surface 3 of the prism 1 from the left of the drawing. When the optical path has an incident angle of 0°, ±0.5°, each light beam is expressed as a primary light beam and two subordinate light beams. Reference symbol 2 indicates the opening aperture As shown in FIG. 1A, the five optical operating surfaces, namely; the transmission surface 3, the branching surface 6, the reflection surface 4, the transmission surface 7, and the reflection surface 5, are arranged around the periphery of the prism 1 in the counterclockwise direction in that order. As a result, after the incident light beam 51 reaches the transmission surface 3, the reflection surface 4, the reflection surface 5, the branching surface 6, and the transmission surface 7 in that order, the image is formed on the image surface 8, thus forming a single optical path. In this order of the transmission surface 3, the reflection surface 4, the reflection surface 5, the branching surface 6, and the transmission surface 7 on the optical path, these surfaces are referred to below as the first surface, second surface, third surface, fourth surface, and fifth surface.

According to this configuration, the first surface and the second surface are not adjacent on the periphery, and the third surface, the fifth surface, and the fourth surface are interposed in a region between these surfaces. Moreover, the third surface and the fourth surface are not adjacent on the periphery, and the first surface, the fourth surface, and the fifth surface are interposed in a region between these surfaces. Furthermore, the fourth surface and the fifth surface are not adjacent on the periphery, and the first surface, the third surface, and the second surface are interposed in a region between these surfaces.

As a result, since the optical path from the third surface to the fourth surface, and the optical path from the fourth surface to the fifth surface, exist within the prism 1 between the first surface and the second surface, the positional relationship is such that the primary light beam from the first surface towards the second surface on the axis intersects the primary light beams of these two optical paths on the axes. In the same manner, since the optical path from the first surface to the second surface, and the optical path from the second surface to the third surface, exist within the prism 1 between the fourth surface and the fifth surface, the positional relationship is such that the primary light beam from the fourth surface towards the fifth surface on the axis intersects the primary light beams of these two optical paths on the axes.

That is, within these optical paths, the optical path between the first surface and the fourth surface is folded into a triangular shape within the prism 1, and the optical path from the fourth surface to the fifth surface intersects the optical path from the first surface to the second surface and the optical path from the second surface to the third surface, emitted to the exterior of the prism 1, and forms an image on the image surface 8. That is, there exists a first triangular fold formed in the optical path between the first surface and the fourth surface, and a second triangular fold formed in the optical path between the second surface and the fourth surface.

Consequently, by containing the optical path from the fourth surface to the fifth surface within the prism 1, the optical path is folded into a single triangular shape, and can form a more compact and miniaturized eccentric optical system in comparison to a conventional prism, even in optical apparatus wherein the focal length is long and the optical path is long.

In the present embodiment, since the primary light beams 50 on the axis are in the same plane (the plane of the paper in the drawing), the optical paths intersect as explained above, even if the incident field angle changes. On the other hand, when the incident light beam 51 has an incident field angle in a plane orthogonal to the plane of the paper, it proceeds on a three-dimensional optical path. In this case, if the section explained above as intersecting is substituted by a positional relationship wherein it is twisted so that it intersects when the optical path is projected in the direction of the plane of the paper, it is apparent that the optical path is folded compactly in the same manner as above within the range of the thickness of the prism 1 in a direction perpendicular to the plane of the paper.

Hereunder, in order to simplify the explanation, the explanation concentrates on a two-dimensional optical path, and explains the three-dimensional optical path only as necessary. The explanation of the two-dimensional optical path can generally be expanded to cover the three-dimensional optical path without problems.

In the present embodiment, rotationally asymmetric free-form curved surfaces are adopted for at least two of the five optical operating surfaces.

Therefore, at first, a coordinate system and a free-form curved surface equation for representing the rotationally asymmetric surfaces in the eccentric optical system, are explained.

As shown in FIG. 1A, the coordinate system, is defined as the incident optical axis on the track of the light beam from the object to the opening aperture 2 and the prism 1, to the center of the transmission surface 3 of the prism 1 orthogonal to the center of the opening aperture 2 forming the aperture face for the primary light beams 50 on the axis. Therefore in the track of the light beam, with the center of the opening aperture 2 as the origin of the eccentric optical surface of the eccentric optical system (the position of the origin of the coordinate axis shown in the drawing has been displaced in order to avoid overlap with the optical path), and with the direction along the incident optical axis as the Z axis, the direction from the object towards the surface opposite the aperture opening 2 of the eccentric optical system being the positive direction of the Z axis, and the plane of the paper as the Y-Z plane, the direction from the front towards the rear of the paper being the positive direction of the X axis, the X axis and the Z axis constitute a right-hand rectangular coordinate system.

If the angles of inclination being the centers of the X axis, Y axis, and Z axis are assumed to be α, β, and γ respectively, the positive angles of inclination α and β are defined as being counterclockwise in relation to the positive directions on the X axis and Y axis respectively, and the positive angle of inclination γ is defined as being clockwise in relation to the positive direction on the Z axis.

If each optical operating surface is expressed within a coordinate system, the primary light beam 50 on the axis is tracked successively from the object towards the image surface, with the point wherein the optical operating surface and the primary light beam 50 on the axis intersect as the origin, and while maintaining the X axis in the direction perpendicular to the plane of the paper, the Y axis and Z axis are expressed in a rotated local coordinate system so that the Z axis matches the primary light beam 50 on the axis.

The method with which the angles α, β, and γ on the central axis of the surfaces are rotated is such that the central axis of the surface and its XYZ rectangular coordinate system is first rotated counterclockwise about the X axis by the angle α, the central axis of the rotated surface is then rotated counterclockwise about the Y axis of the new coordinate system by the angle β, the once-rotated coordinate system is also rotated counterclockwise about the Y axis by the angle β, and the central axis of the twice-rotated surface is then rotated clockwise about the Z axis of the new coordinate system of the new coordinate system by the angle γ.

The shape of the rotationally asymmetric curved surfaces employed in the present embodiment, are, for example, expressed by the free-form curved surface equation defined by equation (a) below. The Z axis of equation (a) is the axis of the free-form curved surface.

[Equation 1]

$$Z = (r^2/R) / \left[1 + \sqrt{\{1 - (1+k)(r/R)^2\}}\right] + \sum_{j=1}^{66} C_j X^m Y^n \quad (a)$$

The first expression of equation (a) is that for a sphere, and the second is that for the free-form curved surface. In the sphere expression, R is the peak radius of the paraxial curvature, k is the coning constant, and $r=\sqrt{(X^2+Y^2)}$.

The expression for the free-form curved surface is as follows.

[Equation 2]

$$\sum_{j=1}^{66} C_j X^m Y^n = C_1 + C_2 X + C_3 Y + C_4 X^2 + C_5 XY + C_6 Y^2 +$$
$$C_7 X^3 + C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y +$$
$$C_{18} X^3 Y^2 + C_{19} X^2 Y^3 + C_{20} XY^4 + C_{21} Y^5 + C_{22} X^6 +$$
$$C_{23} X^5 Y + C_{24} X^4 Y^2 + C_{25} X^3 Y^3 + C_{26} X^2 Y^4 +$$
$$C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7$$

where $C_j$ is a coefficient with j as an integer of 1 or more.

The free-form curved surfaces are generally not symmetrical for either the X-Z plane or the Y-Z plane. However, in the present embodiment, by setting all the odd-numbered expressions to 0, a free-form curved surface wherein a single symmetrical surface exists parallel to the Y-Z plane is formed. For example, in the defining equation (a), this is possible by setting the coefficient for each expression $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$ and so on, to 0.

The following explains each optical operating surface in greater detail.

The transmission surface 3 (first surface) is an optical operating surface for refracting the incident light beam 51, and for refracting the primary light beam 50 on the axis in the X axis direction, due to its positioning eccentrically or inclined about the X axis, in relation to the primary light beam 50 on the axis.

The transmission surface 3 can be, for example, a flat plane to simplify manufacture. However preferably the incident light beam 51 is a convergent light beam, the power of the other optical operating surfaces is reduced, and the power is positive in order to simplify aberration compensation.

When the power is positive it is more preferable that the Y-Z plane asymmetric in the direction of inclination be a free-form curved surface being a symmetrical rotational asymmetric curved surface, in order to reduce eccentric aberration.

The reflection surface 4 (second surface) is the surface of the eccentric optical system having the primary positive power, and is positioned eccentrically in relation to the primary light beam 50 on the axis refracted by the transmission surface 3, so that the optical path can be folded on the third surface side. As shown in FIG. 1A, the amount of this eccentricity is expressed by the angle of inclination θ1 formed between the tangential plane at the point of intersection of the primary light beam 50 on the axis and the reflection surface 4, and the plane including the aperture opening 2.

The reflection surface 4 can be manufactured by application of an appropriate reflective film coating to the boundary surface of a medium machined to the required curvature. If possible, the light beam incident on the reflection surface 4 from the first surface may be completely reflected, and the reflective film coating omitted.

Since the reflection surface 4 is an internal reflection surface reflecting the light beam within the medium having a refractive index of 1 or more, a large power can be provided even with a comparatively small curvature.

On the other hand, since the reflection surface 4 is a refracting-reflection surface, aberration due to eccentricity, that is, eccentric aberration, occurs. In order to compensate for this eccentric aberration, preferably the reflection surface 4 is made a rotationally asymmetric surface.

The reflection surface 5 (third surface) is positioned either eccentrically or inclined in relation to the primary light beam 50 on the axis of the convergent light so that the convergent light reflected by reflection surface 4 can be reflected and folded on the fourth surface side. Machining of the reflection surface 5 can be in the same manner as for the reflection surface 4.

As shown in FIG. 1A, the amount of eccentricity or inclination of the reflection surface 5 is expressed by the angle of inclination θ2 formed between the tangential plane at the point of intersection of the primary light beam 50 on the axis and the reflection surface 5, and the plane including the aperture opening 2. The relationship between the angle of inclination θ1 and θ2 satisfies the following equation.

$$30° \leq |\theta 2 - \theta 1| \leq 80° \tag{1}$$

The shape of the reflection surface 5 may be a flat reflection surface for ease of manufacture. However in order to reduce the power of other optical operating surfaces it is desirable that it have positive power. For example, power can be distributed between the reflection surface 4 and the reflection surface 5, and the aberration occurring at each surface may be continually reduced and the input light condensed.

Alternatively, negative power may be provided in order to compensate for the spherical aberration and coma aberration occurring on the transmission surface 3 and reflection surface 4. If negative power is provided, the Petzval sum can be improved for the off-axis light beam, and when the field angle of the input light is large, a satisfactory imaging performance can be obtained.

When power is provided, it is desirable that a rotationally asymmetric surface be employed to compensate for eccentric aberration.

As shown in FIG. 1B, the branching surface 6 (fourth surface) is an optical operating surface branching the light beam reflected by the reflection surface 5 into, reflected light internally reflected and directed towards the transmission surface 7, and transmitted light transmitted to the exterior of the prism 1 and forming an image on the image surface 9, and is positioned eccentrically or inclined in relation to the primary light beam 50 on the axis of the incident light beam. As shown in FIG. 1A, this amount of eccentricity or inclination is expressed by the angle of inclination θ3 formed between the tangential plane at the point of intersection of the primary light beam 50 on the axis and the branching surface 6, and the plane including the aperture opening 2.

The branching surface 6 can be manufactured by application of a surface treatment such as a reflective coating or half-mirror coating or the like to the boundary surface of the medium to control the reflection factor in relation to the internal incident light.

Moreover, when it is not necessary to significantly raise the reflection factor, the optical path can be branched by the reflection occurring as a result of the difference between the reflection factor of the medium and the reflection factor of the air, and the surface treatment such as a reflective coating or half-mirror coating or the like can be omitted. In this case, an advantage is provided in that trouble associated with the surface treatment is unnecessary, and the cost of manufacture can be reduced.

The shape of the branching surface 6 can be either convex or concave in relation to the outside of the prism 1, or flat, as necessary.

When convex towards the outside of the prism 1, the power normally obtained with one surface is large at the reflecting side, and a shorter focal distance in comparison to the optical path of the transmitted light can therefore be provided. In this case, for example, the reflected light from the branching surface 6 can be formed into an image within the medium, and an image can be formed in proximity to the transmission surface 7.

When power is provided with the branching surface 6 being either convex or concave, it is desirable to employ a rotationally asymmetric surface in order to compensate for eccentric aberration.

When the branching surface 6 is a flat surface, the imaging performance with reflected light and transmitted light can be approximately equal. Furthermore, if a flat surface is employed and manufacture of the branching surface 6 involves grinding, when manufacture itself is by casting, the die is manufactured with flat surfaces, and thus manufacture is simplified, and costs reduced.

The transmission surface 7 (fifth surface) is an optical operating surface wherein the reflected light from the branching surface 6 is transmitted through the medium and emitted to the exterior of the prism 1. The branching surface 6 is positioned either approximately parallel, or is eccentric or inclined at a shallow angle. In practice, the amount of eccentricity or inclination is expressed by the angle of inclination θ4 formed between the tangential plane at the point of intersection of the primary light beam 50 on the axis and the transmission surface 7, and the plane including the aperture opening 2 (see FIG. 1A), and the relationship between θ3 and θ4 satisfies the following equation.

$$|θ4-θ3| \leq 20° \qquad (2)$$

Since the shape of the transmission surface 7 images the light beam reflected by the branching surface 6 on the image surface 8 at the appropriate position, a surface provided with either positive or negative power, or a flat surface, can be employed.

When a surface provided with power is employed, it is desirable that the reflection surface 4 be a rotationally asymmetric surface in order to compensate for eccentric aberration.

Moreover, when a flat surface is employed, manufacture is simplified, and costs reduced, as with the branching surface 6.

By providing these five optical operating surfaces, the prism 1 can form the incident light beam 51 into images on the image surfaces 8 and 9. In this case, in order to ensure a compact configuration in comparison to the length of the optical path, it is desirable that a configuration be employed wherein the power of each optical operating surface is set appropriately so that the paraxial focal distance F (in mm) of the eccentric optical system satisfies the following equation.

$$60(\text{mm}) \leq F \leq 500(\text{mm}) \qquad (3)$$

Furthermore, in order to ensure that the eccentric optical system is well-balanced in comparison to the length of the optical path, with the incident aperture diameter as D (in mm), it is desirable that a configuration be employed wherein the ratio F/D satisfies the following equation. The incident diameter D is the diameter of the opening aperture 2.

$$2 \leq F/D \leq 15 \qquad (4)$$

The following explains the effect of the prism 1 along the optical path of the eccentric optical system.

The incident light beam 51 is restricted to the diameter D of the incident aperture by the opening aperture 2, and is incident on the transmission surface 3.

Since the transmission surface 3 is positioned eccentrically or inclined about the X axis in relation to the primary light beam 50 on the axis, the incident light beam 51 is refracted and directed outside the incident optical axis.

The light beam then proceeds within the medium, reaching the reflection surface 4, and is reflected internally. Since the reflection surface 4 has a positive power, and is eccentric on the X axis, the light beam is continually condensed, and proceeds towards the reflection surface 5 arrayed adjacent to the clockwise direction (positive direction on the X axis) of the transmission surface 3 in the drawing. Since the reflection surface 5 is adjacent to the transmission surface 3, the light beam transmitted through the transmission surface 3 is not vignetted by the reflection surface 5.

The light beam reflected by the reflection surface 4 is reflected internally by the reflection surface 5, is continually subjected to the optical effect in accordance with the curvature of the reflection surface 5, and proceeds towards the branching surface 6 arrayed adjacent to the clockwise direction (positive direction on the X axis) of the transmission surface 3 in the drawing. Since this light beam intersects the light beam of the primary light beam on the axis from the transmission surface 3 to the reflection surface 4, it is folded into a triangular shape within the prism 1. Here, since the branching surface 6 is adjacent to the transmission surface 3, the light beam transmitted through the transmission surface 3 is not vignetted by the branching surface 6.

A satisfactory imaging performance is obtained by setting the angle of inclination |θ2-θ1| expressing the inclination between the reflection surface 4 and the reflection surface 5 on such an optical path, to within the range as shown in equation (1).

When coma aberration occurring as a result of applying the primary light beam 50 on the axis to the reflection surface 4 being a concave mirror is compensated by providing asymmetric power to the reflection surface 4, the aforementioned range indicates the range within which coma aberration of the off-axis light beam can be satisfactory compensated. When the angle of inclination |θ2-θ1| exceeds 80°, the asymmetry of the power provided to the reflection surface 4 becomes too large and compensation of coma aberration of the off-axis light beam becomes difficult.

Moreover, when the lower limit is exceeded, that is, the angle of inclination |θ2-θ1| becomes less than 30°, the symmetry between the reflection surface 4 and the reflection surface 5 collapses dramatically, and aberration occurs to an extent which cannot be compensated.

In order to obtain a greater reduction in aberration, and a satisfactory imaging performance, it is desirable that the range of the angle of inclination |θ2-θ1| be within the range of the equation (1). For example, $$35° \leq |θ2-θ1| \leq 70° \qquad (5)$$

is more desirable. Furthermore, $$40° \leq |θ2-θ1| \leq 60° \qquad (6)$$

is even more desirable.

As shown in FIG. 1A, the light beam reflected internally by the branching surface 6 is continually subjected to the optical effect in accordance with the curvature of the branching surface 6, and intersects with the primary light beam on the axis of the light beam from the transmission surface 3 to the reflection surface 4 and the primary light beam on the axis of the light beam from the reflection surface 4 to the reflection surface 5, and proceeds towards the transmission surface 7 between the reflection surface 5 and the reflection surface 4. That is, it is folded into a triangular shape by the reflection surface 4, the reflection surface 5, and the branching surface 6 and proceeds within the medium.

The light beam reaching the transmission surface 7 is continually subject to the optical effect in accordance with the curvature and angle of inclination of the transmission surface 7, and is emitted to the outside of the prism 1, and an image is formed on the image surface 8 corresponding to the focal distance of the eccentric optical system in such an optical path.

In this optical path, the angle of inclination |θ4-θ3| indicating the degree of parallel between the branching surface 6 and the transmission surface 7 is set within the range of equation (2). By setting this angle so that the two surfaces are approximately parallel or the angle of inclination is shallow, the collapse of the image surface in the focal plane can be reduced, a satisfactory imaging performance can be provided, and the eccentric optical system can be miniaturized.

That is, when the angle of inclination |θ4-θ3| exceeds 30°, the light beam from the branching surface 6 to the transmission surface 7 is significantly refracted in the transmission surface 7, resulting in considerable off-axis aberration, and collapse of the image surface. As a result, imaging performance deteriorates, and particularly when a photodetector is positioned on the image surface 8, since the photodetector must be positioned inclined in the direction away from the prism 1, a compact device cannot be obtained. However this can be avoided under the conditions of equation (2).

In order to reduce aberration and collapse of the image surface, it is desirable that the upper limit value of equation (2) for the angle of inclination |θ4−θ3| be reduced. For example, $$|θ4−θ3|≤20°\qquad(7)$$

is more desirable.

On the other hand, as shown in FIG. 1B, the light beam transmitted by the branching surface 6 is continually subject to the optical effect in accordance with the curvature of the branching surface 6, and is emitted to the outside of the prism 1, and an image is formed on the image surface 8 corresponding to the focal distance in the eccentric optical system on the optical path.

According to the prism 1, the optical path forming the image on the image surface 8 is reflected three times within the medium having a refractive index of one or more and folded in a compact manner. Therefore, even when the optical path is long, a compact eccentric optical system can be provided.

In this case, if the paraxial focal distance F of the eccentric optical system of the five optical operating surfaces is within the range of equation (3), since the paraxial focal distance F is 500 mm or less, the size of the prism 1 itself can be of a size at which the highly accurate rotationally asymmetric surfaces can be sufficiently machined. Moreover, since the paraxial focal distance F is 60 mm or more, there is no possibility that the length of the optical path will become too short, thus inhibiting the effect of folding of the optical path. As a result, the effect of folding of the optical path is not inhibited, and eccentric optical systems having optical paths up to a comparatively long length can be miniaturized, and manufactured within a rational range.

Consequently, it can be employed in optical apparatus requiring comparatively long optical paths, for example, telescopic lenses and optical apparatus for spacial optical communications and the like, and has the advantages of being able to be small and light, and of low cost.

Preferably, the range of equation (3) is reduced in order to ensure better balance, miniaturization, and low-cost in comparison with optical path length. For example, $$80(mm)≤F≤400(mm)\qquad(8)$$

is preferable, and $$100(mm)≤F≤300(mm)\qquad(9)$$

is even more preferable.

Furthermore, if the range of the ratio F/D of the paraxial focal distance F and the incident aperture diameter D is within the range of equation (4), the ratio F/D is 15 or less. Therefore, the optical path is too long so that the prism 1 becomes large, or an eccentric optical system can be formed so that the back-focus does not become too long. Moreover, since the ratio F/D is two or more, the light beam diameter becomes large in comparison to the focal distance, and since NA is large, an eccentric optical system is possible wherein spherical aberration and coma aberration do not become large enough so that they can no longer be compensated. As a result, in comparison to the optical path length of the prism 1, a format having good balance continues, and a superior imaging performance is possible.

It is preferable to reduce the range of the ratio F/D in order to ensure a better balanced eccentric optical system. For example, $$3≤F/D≤10\qquad(10)$$

is preferable, and $$4≤F/D≤8\qquad(11)$$

is even more preferable.

It is more desirable that the conditional expressions (1) through (11) be appropriately combined.

Furthermore, since at least two of the five optical operating surfaces are rotationally asymmetric surfaces, they are asymmetric curved surfaces on the side of subordinate light beams in relation to the primary light beam 50 on the axis, and since eccentric aberration can be accurately compensated by their combination, an eccentric optical system with little eccentric aberration can be provided.

In this case, all five surfaces may be rotationally asymmetric surfaces. If the number of rotationally asymmetric surfaces is increased in this manner, it is possible to very accurately compensate for aberration. Moreover, apportioning the amount of compensation amongst the optical operating surfaces has the advantage that the individual curved surfaces are of a shape which is easily manufactured.

If compensation of the eccentric aberration necessary for two rotationally asymmetric surfaces is possible, the remainder may be easily manufactured rotationally symmetric surfaces or flat surfaces, and manufacturing costs can be reduced. In particular, manufacturing costs can be reduced dramatically by the use of one or two flat surfaces.

Furthermore, in the present embodiment, the light beam is branched by the branching surface 6. By changing the curvature of the branching surface 6 and the curvature of the transmission surface 7, the optical performance of each optical path after branching, for example, the paraxial focal distances can be made equal or different.

Consequently, the amount of movement when the size of the images on the image surfaces 8 and 9, and the incident field angle of the incident light beam 51, are changed can be of different configurations for image surfaces 8 and 9. In this case, for example, use of a detector of the position of the image formed on the image surfaces 8 and 9 has the advantage that detection of the change in the field angle of the incident light beam 51 at different detection accuracies is possible.

FIG. 2 is an optical path diagram explaining optical paths through the branching surface 6 in the prism 1 when the incident field angle is 0° and ±3°.

The following explains a modified example of the present embodiment.

Figure 3:
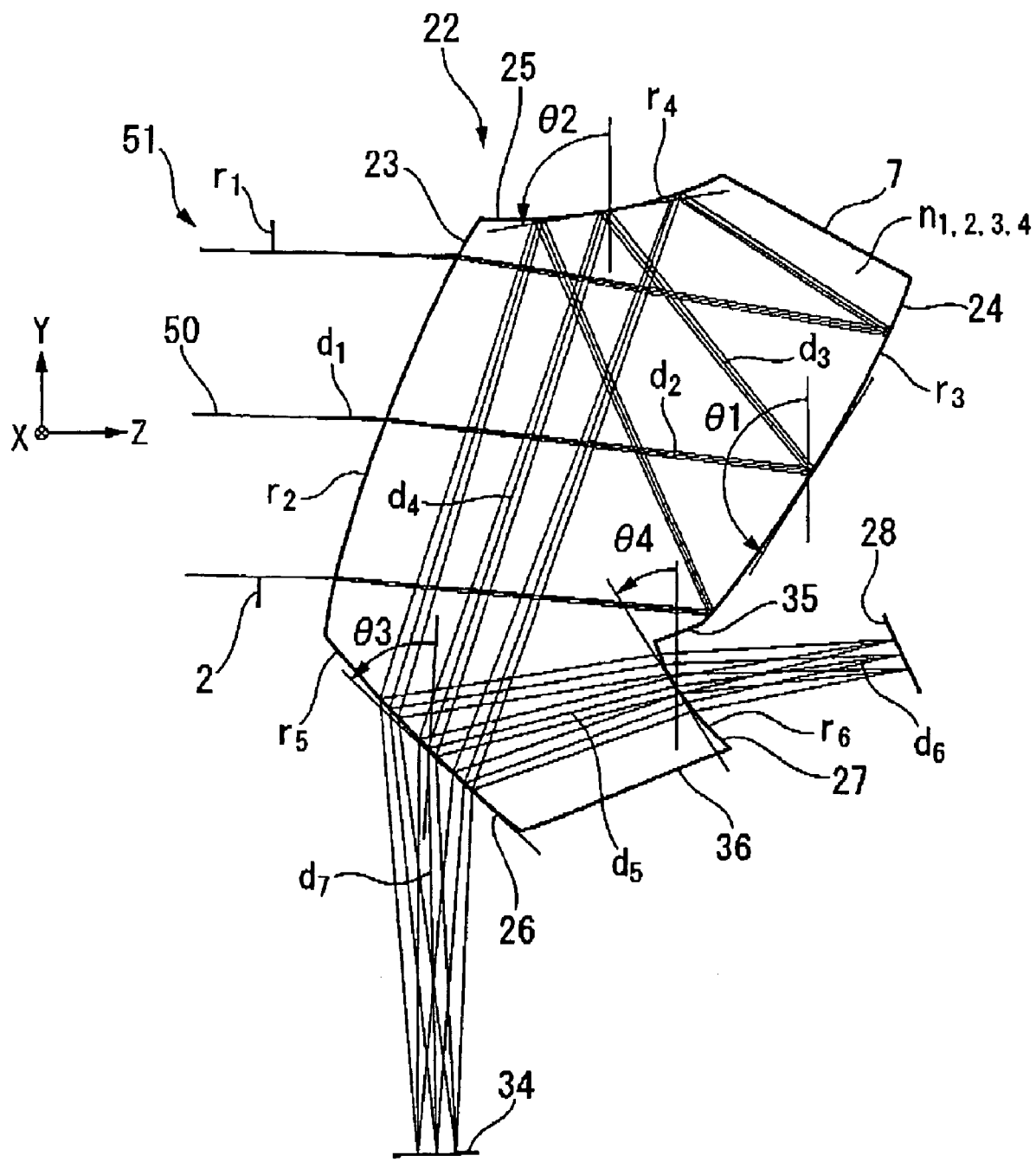
FIG. 3 is a section drawing explaining the shape and optical path of a modified example of the prism being the eccentric optical system according to the first embodiment of the present embodiment.

FIG. 3 is a section drawing explaining the shape and optical path of the modified example of the prism being the eccentric optical system according to the first embodiment of the present embodiment. The optical path is expressed by a primary light beam and two subordinate light beams for each of the incident field angles 0° and ±0.5°.

A prism 22 in the present modified example substitutes a transmission surface 23 (first surface) for the transmission surface 3, a reflection surface 24 (second surface) for the reflection surface 4, a reflection surface 25 (third surface) for the reflection surface 5, a branching surface 26 (fourth surface) for the branching surface 6, and a transmission surface 27 (fifth surface) for the transmission surface 7, of the prism 1. Each optical operating surface is positioned either eccentrically or inclined in the aforementioned manner, and each surface has the same shape. In the same manner, it is desirable that equations (1) through (4) are satisfied, and particularly that the appropriate combinations within equations (5) through (11) are satisfied.

On the other hand, in the present modified example, in difference to the above, the optical operating surfaces are arranged in the peripheral direction in a counterclockwise direction in the drawing (positive direction of the X axis) in the order of; the transmission surface 23, the branching surface 26, the transmission surface 27, the reflection surface 24, and the reflection surface 25. Moreover, the boundary surfaces 36 and 35 of the medium which are not employed as optical operating surfaces are provided between the branching surface 26 and transmission surface 27, and between the transmission surface 27 and reflection surface 24, in the peripheral direction. Therefore, the primary light beam 50 on the axis of the light beam from the branching surface 26 towards the reflection surface 17 does not intersect with other primary light beams 50 on the axis of the light beam.

That is, the optical path of the present modified example is folded in a triangular shape including the transmission surface 23, the reflection surface 24, and the reflection surface 25, and branched into reflected light and transmitted light by the branching surface 26. Then, the transmission light is emitted from the prism 22 and at the point where this is formed into an image on the image surface 34, the light passes through a common point. However the light beam reflected by the branching surface 26 passes through the transmission surface 27 without crossing other optical paths, and is emitted from the prism and formed into an image on the image surface 28.

This configuration has the advantage that the image surface 28 can be provided outside the prism 22 even when the power of the branching surface 26 is large. Moreover, the optical path of the emitted light from the transmission surface 27 towards the image surface 23 can be emitted in approximately the same direction as the incident light beam 51, this being convenient for layout when a space exists at the rear of the prism 22 (at the right in the drawing).

If the effective diameter of the light beam can be ensured, boundary surfaces such as the boundary surfaces 36 and 35 of the medium which are not employed as optical operating surfaces can also be provided appropriately for the prism 1. Such boundary surfaces, can, for example, be provided as pressure faces employed in positioning the prism 1, and as chamfers employed in preventing chipping of corners etc.

Furthermore, since the configuration is such that the maximum length L of the prism in the flat plane including the bent optical axis in relation to the incident aperture diameter is $$1.3 \leq L/D \leq 2.1, \tag{12}$$

a very compact eccentric optical system can be realized.

Second Embodiment

The following explains an eccentric optical system of a second embodiment of the present invention.

Figure 4:
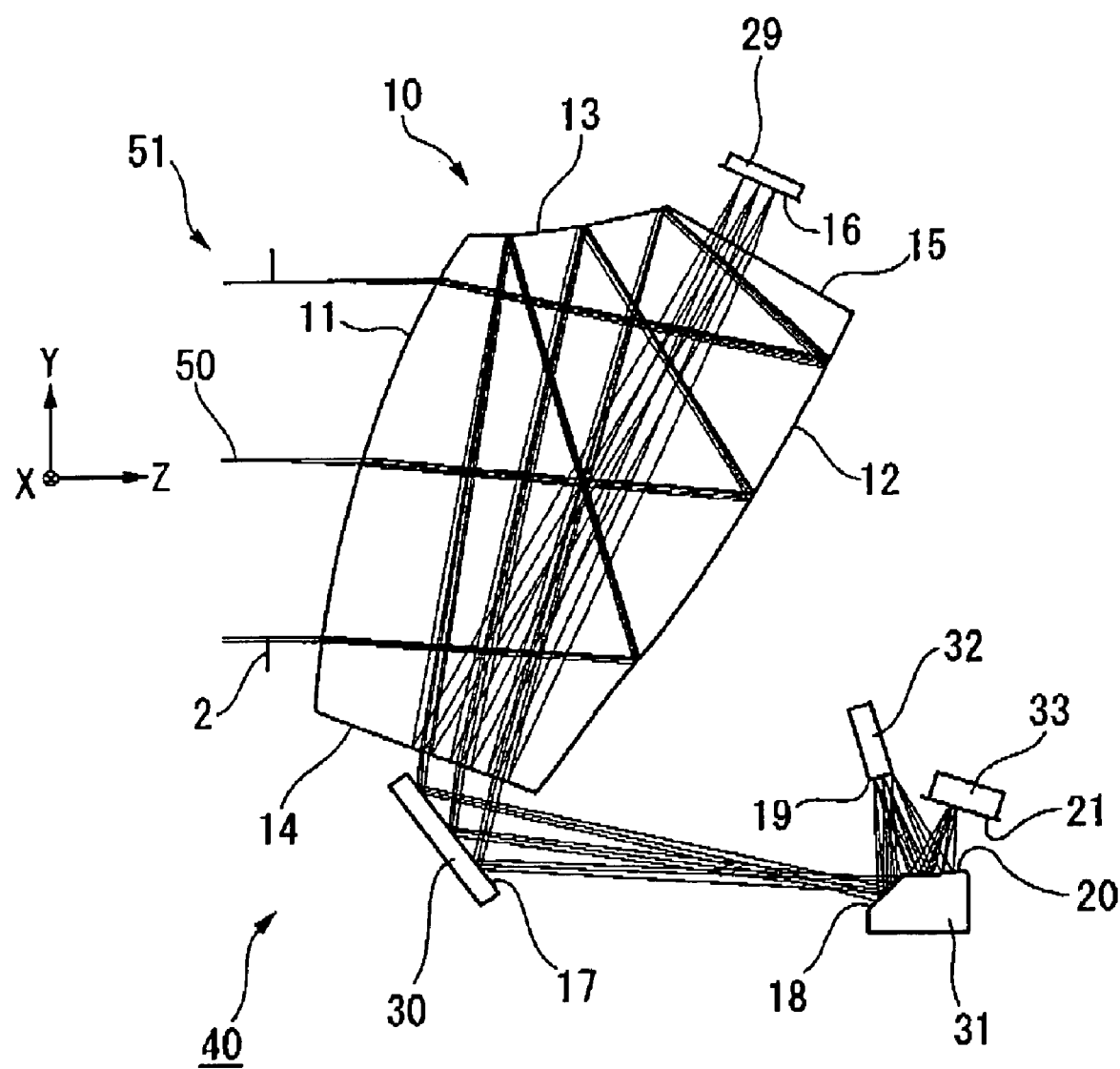
FIG. 4 is an outline section drawing explaining an eccentric optical system according to a second embodiment of the present invention.
Figure 5A:
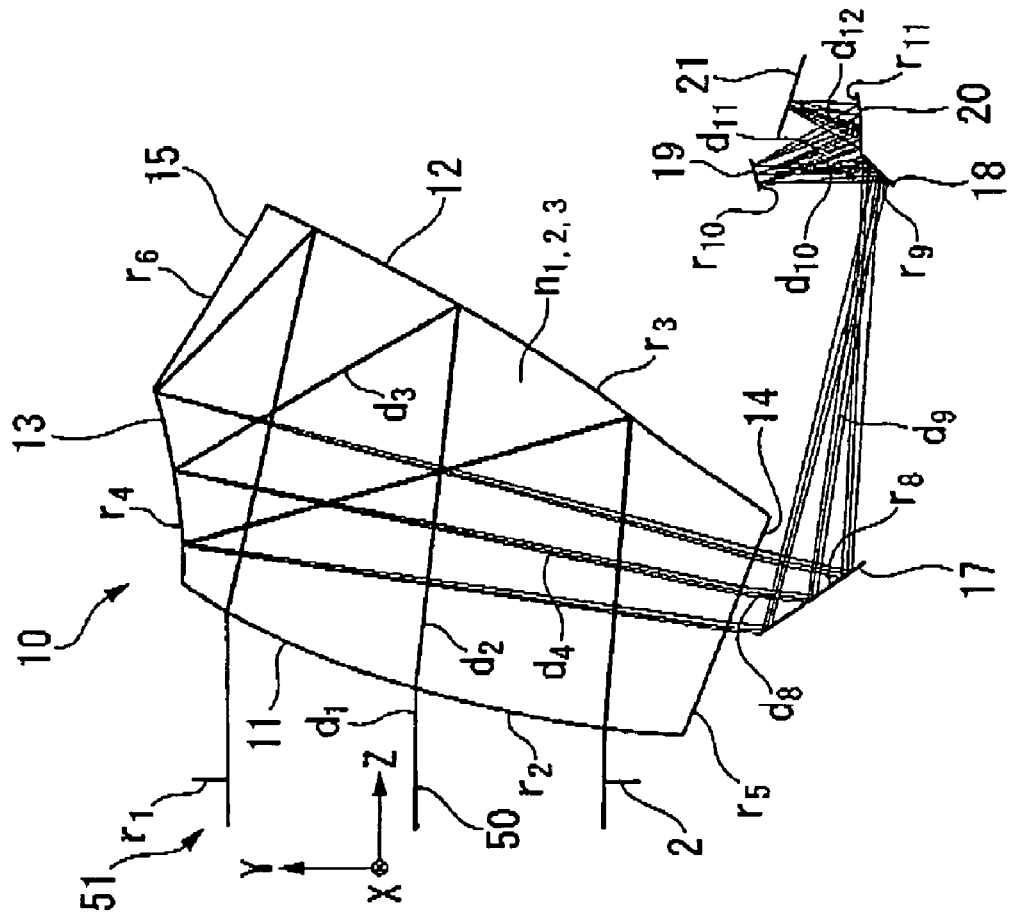
FIGS. 5A and 5B are optical path diagrams explaining one example of the optical path of the eccentric optical system according to the second embodiment of the present invention.
Figure 5B:
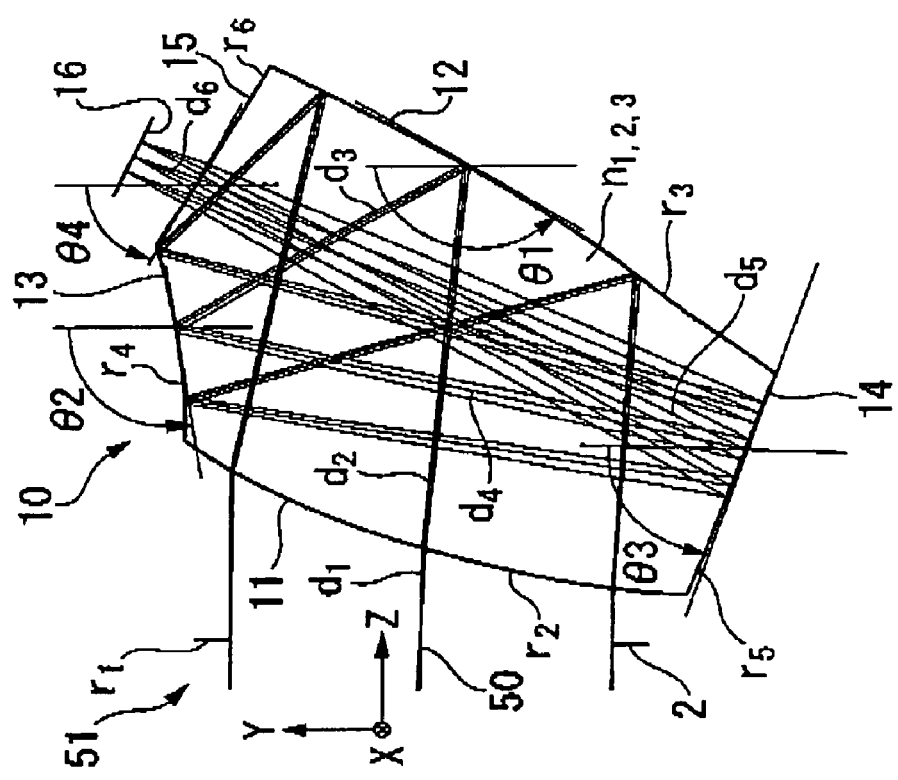

FIG. 4 is an outline section drawing explaining the eccentric optical system according to the second embodiment of the present invention. FIG. 5 is an optical path diagram explaining one example of the optical path of the eccentric optical system according to the second embodiment of the present invention. The optical path is expressed as a primary light beam and two subordinate light beams having an incident angle of 0°, ±0.5° in FIG. 5A, and an incident angle of 0°, ±0.2° in FIG. 5B.

The following explains the eccentric optical system 40 according to the second embodiment of the present invention.

The eccentric optical system 40 is an eccentric optical system for forming the incident light beam 51 in an image on photodetectors 29 and 33, and in addition to the photodetectors 29 and 33, is provided with an opening aperture 2, a prism 10 (an eccentric optical system), a reflective mirror 30, a reflecting optical device 31, and a galvanomirror 32 (a light-deflecting device), according to the first embodiment of the present invention.

Provided the prism 10 is the same prism as in the first embodiment, and employs an appropriate light-condensing device to condense the light emitted from the prism outside the prism, any configuration is satisfactory. The following explanation employs an example having a configuration approximately similar in configuration to the prism 1 wherein the emitted light can be condensed.

That is, as shown in FIG. 5A, this substitutes a transmission surface 11 (first surface) for the transmission surface 3, a reflection surface 12 (second surface) for the reflection surface 4, a reflection surface 13 (third surface) for the reflection surface 3, a branching surface 14 (fourth surface) for the branching surface 6, and a transmission surface 15 (fifth surface) for the transmission surface 7, of the prism 1. Each optical operating surface is positioned either eccentrically or inclined in the aforementioned manner, and each surface shape has the same shape. In the same manner, it is desirable that equations (1) through (4) are satisfied, and particularly that the appropriate combinations within equations (5) through (11) are satisfied.

The light beam reflected by the branching surface 14 passes through the transmission surface 15 and is formed into an image on the image surface 16 in the vicinity of the prism 10 (this optical path is hereafter referred to as the "reflecting optical path"), and the light beam transmitted by the branching surface 14 is formed into an image at a position separated from the branching surface 14 by a distance sufficient for folding of the optical path via a reflection surface 17 (this optical path is hereafter referred to as the 'transmission optical path').

The reflective mirror 30 is provided with the reflection surface 17, and is a mirror fixed in position in relation to the prism 10 in order to ensure that the light beam emitted from the branching surface 14 is folded in the appropriate direction. Since the light beam emitted from the branching surface 14 is emitted in a direction having an angle of inclination in relation to the incident light beam 51, by setting the angle at which the reflective mirror 30 is installed appropriately, the optical path can be switched to the approximate direction of the incident light beam 51.

The reflecting optical device 31 is positioned to the rear of the image formation surface on the transmitting optical path, and is an integrated optical device including a collimator reflection surface 18 (an optical device having positive power) having positive power to ensure that the light beam dispersed after formation of the image is an approximately parallel light beam, and a concave reflection surface 20 (a light-condensing device) having positive power to ensure that the approximately parallel light beam when the light beam is folded by the collimator reflection surface 18 is formed into an image at the required position on the image surface 21.

It is desirable that both the collimator reflection surface 18, and the concave reflection surface 20, are rotationally asymmetric surfaces to reduce eccentric aberration.

The shapes of each of the reflection surfaces of this reflecting optical device 31 can be machined from basic materials such as metal, optical glass, or plastic and the like, or if possible can be manufactured by forming using a metal mold, and a reflective film applied.

Manufacture of the collimator reflection surface 18 and the concave reflection surface 20 as an integral unit has the advantage of being able to eliminate adjustment of the positional relationship, while at the same time providing a compact and low-cost device. Alternatively, if the collimator reflection surface 18 and the concave reflection surface 20 are manufactured separately, they may be arranged in the required positions relative to each other. In this case, since the collimator reflection surface 18 and the concave reflection surface 20 are manufactured separately, depending upon the shape of the reflection surfaces, manufacture can be simplified in some cases.

The galvanomirror 32 provides a rotating reflection surface 19 formed from a flat plane at a position in the vicinity of the emitting aperture formed by the approximately parallel light beam reflected by the collimator reflection surface 18, and it is possible to rapidly deflect the approximately parallel light beam to the required angle of deflection.

The light receiving surfaces of the photodetectors 29 and 33 are photosensors positioned on the image surfaces 16 and 21. For example, in a telescopic lens application, a CCD (Charge Coupled Device) imaging device can be employed to convert the image to a digital signal by photoelectric conversion, and transmit it to a monitor and the like, and in an optical communications application a photoelectric conversion device can be employed to convert the optical strength of the image to waveform data by photoelectric conversion, and a modulated signal then extracted.

Moreover, when the incident light beam 51 has incident field angles in two axial directions, the position at which the image is formed from the light beam is detected in two dimensions and a position sensitive detector (PSD) being a device to detect the output detection signal, or a four-part photodetector (four-part PD), can be employed, in at least one of the photodetectors 29 and 33. Since the position detection of a light bean with a PSD or four-part PD is well-known, detailed explanation is omitted. The PSD and four-part PD have the advantage of being highly accurate while at the same time forming a comparatively low cost device for position detection.

Furthermore, in place of the above, the digital image signal from the CCD digital imaging device can be subjected to the appropriate image processing, and the position at which the image is formed detected. In this case, the image may be observed, and the position detected, simultaneously.

Moreover, the photodetector 29 can be a CCD for wide position detection, and the photodetector 33 can be a four-pant PD for accurate position detection, and if the photodetector 33 is also a photodetector receiving a modulated signal for optical communications, an optical apparatus for spacial optical communications with few parts is possible.

The following explains the action of the eccentric optical system of the present embodiment.

Due to the action of the prism 10, the incident light beam 51 incident on the opening aperture 2 is formed into an image on the photodetectors 29 and 33 without vignetting. Moreover, in addition to allowing a compact configuration of the prism 10 in comparison to the length of the optical path, the transmitting optical path can be folded compactly with the reflective mirror 30.

On the other hand, the images on the image surfaces 16 and 21 can be converted into appropriate electrical signals with the photodetectors 29 and 33, and the images observed and communications signals extracted.

In this case, the substitution of a position detection device for at least one of the photodetectors 29 and 33 allows changes in the incident field angle to be detected. When control is employed to adjust the position of the eccentric optical system 40 with a detection signal from a PSD or four-part PD as employed in the present embodiment, the light beam from the required position can be received.

In this case, since a galvanomirror is provided, the position of the photodetector 33 at which the light is received can be maintained constant despite changing the angle of deflection of the galvanomirror 32 in response to changes in the field angle of the incident light beam 51.

At this time, since the light beam incident on the galvanomirror 32 is an approximately parallel light beam the occurrence of aberration due to errors in manufacturing and errors in positioning of the rotating reflection surface 19 can be suppressed, and a satisfactory imaging performance can be obtained.

Furthermore, since the galvanomirror 32 is positioned in the vicinity of the emitting aperture, the effective reflection surface on the rotating reflection surface 19 is approximately constant, and the rotating reflection surface 19 can be reduced in size. As a result, a small and low-cost eccentric optical system can be configured.

According to the eccentric optical system 40 of the present embodiment, even in the case of an optical apparatus having a comparatively long optical path, images can be formed on the light receiving surfaces of a plurality of photodetectors with a compact eccentric optical system having superior imaging performance without loss of input light. Consequently, by changing the imaging performance of each photodetector and light receiving surface, an advantage is obtained wherein the input light can be employed in a plurality of applications.

In particular, since the light-deflecting device is provided, when the incident field angle of the input light changes, the position at which the image is formed can be maintained constant, and an advantage is obtained wherein more stable observation and signal reception is facilitated.

Third Embodiment

The following explains an optical apparatus of a third embodiment of the present invention.

Figure 6:
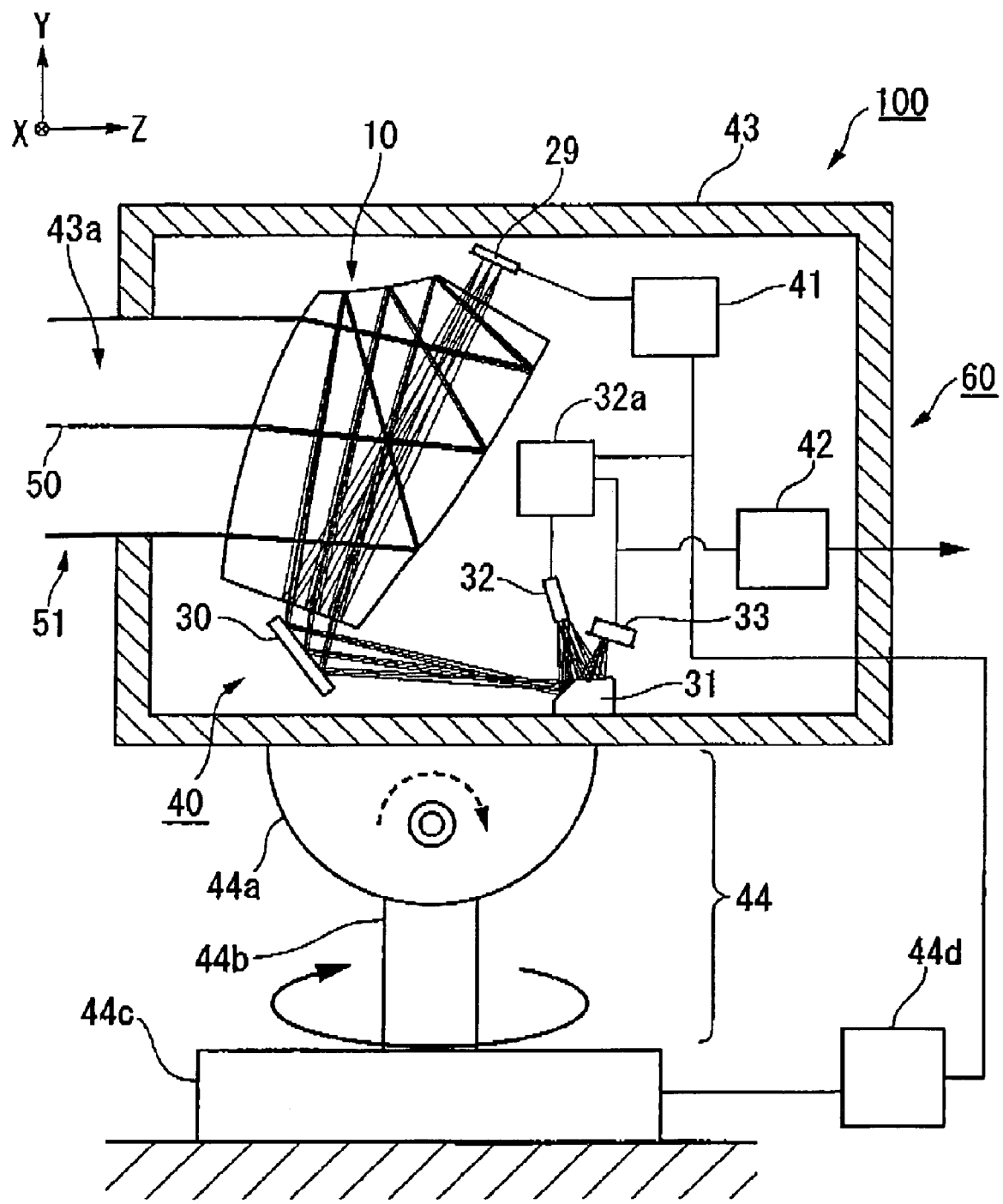
FIG. 6 is a schematic drawing explaining the outline configuration of an optical apparatus according to a third embodiment of the present invention.

FIG. 6 is a schematic drawing explaining the outline configuration of the optical apparatus according to the third embodiment of the present invention.

The following explains the optical apparatus 100 according to the third embodiment of the present invention.

The outline configuration of the optical apparatus 100 includes a light-condensing unit 60 and a gimbal stage (movement mechanism) 44.

The light-condensing unit 60 is provided with a case 43 (exterior of the light-condensing unit), an optical apparatus 40 according to the second embodiment, a control apparatus (position control device), a deflection control device 32a, a light source 45, photodetectors 33 and 46, optical path splitting devices 47 and 48, collimator lenses 52, 53, and 54, an optical device 55, and an input signal control unit 42.

The case 43 is a dual purpose member serving as both a holding member to hold together respective members described below and the exterior member, and is for example, a box shape as appropriate. An opening aperture 43a being an opening forming the incident aperture for the incident light beam 51, is provided in part of the exterior surface of the case. That is, when the case 43 is illuminated by the incident light beam 51 under normal conditions of use, it is provided as the first actual aperture regulating the diameter of the light beam 51, and is a practical realization of the opening aperture 2.

The opening aperture 43*a* may be formed from the case 43 and another members, and there is no strict requirement that it be provided on the exterior surface of the case 43. For example, under normal conditions of use, if there is no possibility of reflection of the incident light beam 51, a hood or the like may be provided around the opening aperture 43*a* to prevent flare.

Moreover, the opening aperture 43*a* need only be optically open, and for example, may be covered by a cover glass transmitting the wavelengths required to be condensed.

The eccentric optical system 40 is fixed to the case 43 via an appropriate support member (not shown in the drawing) so that the opening aperture 43*a* is in the position of the opening aperture 2. The eccentric optical system 40 is shown in FIG. 4 and FIG. 5, and since it has the configuration as explained in the second embodiment, individual explanations are omitted. In the present embodiment, the prism part of the second embodiment is the eccentric optical system 40, and is shown schematically in FIG. 6. The light emitted by the eccentric optical system 40 is deflected by the reflective mirror 30 and an image formed. After formation of the image, the light is formed approximately parallel by the photodetector 55, and the galvanomirror 32 of a deflecting device is positioned at the position of the emitting aperture.

A control unit 41 employs the optical output signal of the photodetector 29 as the input signal, and detects the position at which the image of the light beam is formed on the photodetector 29, computes the displacement from the target position, outputs the position displacement of the light-condensing unit 60, and generates a position detection signal (detection output), and also generates a control signal (detection output) to move the light-condensing unit 60 corresponding to the computation result.

Based on a position detection signal of a control unit 33*a*, the deflection control device 32*a* compensates the displacement of the position wherein the image is formed on the photodetector 46, and controls the angle of deflection of the galvanomirror 32.

The input signal control unit 42 applies the appropriate signal processing to the electrical signal obtained by photoelectric conversion of the image formed on the photodetector 46, and sends the processed signal to a device external to the light-condensing unit 60. Furthermore, if the photodetector 46 incorporates a position detection device, the photodetector 33 can be omitted, and use of a four-part PD allows feedback of the position detection signal to the deflection control device 32*a*, and its use as a control signal for fine adjustment of the galvanomirror 32.

Moreover, particularly in order to use as a photodetector part in spatial optical communications, the photodetector 33 may also function as a device to detect modulated light, and the modulated light may be subjected to the appropriate waveform processing by the input signal control unit 42.

Furthermore, the light source 45 is an LD chip (semiconductor laser), and based on the signal from an output control unit (not shown in the drawing), outputs the optical signal. The emitted light is optimized by the collimator lens 52, and is sent as an optical signal to a similar photodetector device in a location separated from the incident aperture of the eccentric optical system 40 via a reverse optical path to when the light is received. Here, the system can be specialized for transmission, if the photodetector and other related parts are omitted.

The gimbal stage 44 is a movement mechanism supporting the light-condensing unit 60 so that it can be controlled in attitude on two axes, and is provided with a tilt drive part 44*a* and a horizontal rotary drive part 44*b* supported on a support 44*c*, and a drive control device 44*d* to control the amount of movement between the tilt drive part 44*a* and the horizontal rotary drive part 44*b*.

The horizontal rotary drive part 44*b* and the tilt drive part 44*a* are able to rotate to prescribed angles on the vertical and horizontal axes respectively, and may be driven by a mechanism including control motors (not shown in the drawing) and the like for control of each angle of rotation.

The drive control device 44*d* computes the amount of rotary drive for the tilt drive part 44*a* and the horizontal rotary drive part 44*b* based on a control signal generated by the control unit 41, and provides the prescribed rotary drive.

According to the optical apparatus 100 of the present embodiment, when the incident light beam 51 enters the opening aperture 43*a*, images are formed on the photodetectors 29, 33, and 46, and the input signal conveyed on the incident light beam 51 can then be extracted from the photodetector 46.

In this case, when the incident field angle is held in relation to the opening aperture 43*a*, the position of each image formed deviates due to fluctuation of the incident optical path 51, or inappropriate orientation of the light-condensing unit 60. In the present embodiment, however, since the amount of displacement of the position wherein the image is formed on the photodetector 29 is detected by the control unit 41, the gimbal stage 44 can be driven by the control signal passed to the drive control device 44*d*, and the attitude of the light-condensing unit 60 can be controlled.

Furthermore, the photodetector 33 detects small displacements in the position at which the image is formed, the control unit 33*a* sends the position detection signal to the deflection control device 32*a*, and the galvanomirror 32 is controlled to eliminate the displacement.

Generally, the signals extracted from the optical apparatus 100 are often sensitive to variations in the incident field angle, for example, lenses with large magnifications such as telescopic lenses, and optical communications wherein levels of received light vary resulting in signal noise. As a result, if attitude is controlled with only the gimbal stage 44, a highly accurate and rapid-response mechanism is necessary, and the apparatus may become very expensive.

Attitude control with the gimbal stage 44 may include coarse movement for large displacements from the control target, and control of a galvanomirror 32 capable of rapid drive by the deflection control device 32*a* for more accurate positioning to ensure that the position at which the image is formed on the photodetector 33 remains constant. In this case, the image can be formed at a constant position in relation to the photodetector 33 without providing a highly accurate and rapid-response mechanism, and light can always be received in a stable condition.

According to the optical apparatus 100 of the present embodiment, the effects of the action of the eccentric optical system of the first and second embodiments can be provided, while at the same time it can be an optical apparatus wherein input light can be optically tracked with high accuracy and high efficiency.

Moreover, in the present embodiment, since imaging performance such as focal distance and the like can be varied with the reflective optical path and the transmitting optical path, the amount of movement of the image on the photodetectors 29 and 33 when the incident field angle changes can be varied. Consequently it may be configured to detect movement over a wide range with one photodetector, and to detect movement over a narrow range with the other photodetector, with the detection signal of the former being employed for control of coarse movement, and the detection signal of the latter being employed for control of fine movement, of the gimbal stage 44. In this case, the former performs rapid movement over a wide range, and when the target position is approached, accurate movement is performed by the latter, and accurate control of movement is therefore possible over the entire range.

EXAMPLE 1

Next is a description of a first numerical example of the eccentric optical system of the above described first embodiment, with reference to FIG. 1A and FIG. 1B.

The configuration parameters of the optical apparatus of the first numerical example are shown hereunder. Reference symbols $r_i$ and $n_i$ (where i is an integer) shown in FIGS. 1A and 1B, correspond to $r_i$ and $n_i$ of the configuration parameters of the optical apparatus shown hereunder. Refractive index represents the refractive index with respect to the d beam (wavelength 587.56 nm).

Optical path 1 is the optical path (FIG. 1A) of the beam reflected by the branching surface 6. Optical path 2 is the optical path (FIG. 1B) of the beam transmitted through the branching surface 6.

Of the data for the free-form surface (FFS) and the eccentricity, that which is common to the optical paths 1 and 2 is denoted by the common numbers in the [ ] to avoid duplication.

Regarding the coordinate system, since this has been explained above, description is omitted. Symbols α, β and γ in the eccentric expression respectively show the angles for the directions explained above as the direction of the inclination angle. The units of length are (mm) and the units of angle are (°). Moreover, the origin of eccentricity and the center of rotation are appropriately noted in the data.

The free-form surface (FFS) is given by the above described equation (a). The free form surface for which there is no data description, and terms related to an aspheric surface are written as 0.

(Optical path 1)

| Surface number | Radius of curvature | Spacing ∞ | Eccentricity ∞ | Refractive index | Abbe constant body face |
|---|---|---|---|---|---|
| 1 | Aperture face | $d_1 = 0.00$ | Eccentricity [1] | | |
| 2 | FFS[1] | $d_2 = 0.00$ | Eccentricity [2] | $n_1 = 1.5254$ | $v_1 = 56.2$ |
| 3 | FFS[2] | $d_3 = 0.00$ | Eccentricity [3] | $n_2 = 1.5254$ | $v_2 = 56.2$ |
| 4 | FFS[3] | $d_4 = 0.00$ | Eccentricity [4] | $n_3 = 1.5254$ | $v_3 = 56.2$ |
| 5 | FFS[4] | $d_5 = 0.00$ | Eccentricity [5] | $n_4 = 1.5254$ | $v_4 = 56.2$ |
| 6 | ∞ | $d_6 = 0.00$ | Eccentricity [6] | | |
| image surface | ∞ | $d_7 = 0.00$ | Eccentricity [7] | | |

-continued

FFS[1]

| $C_4$ | $1.0403 \times 10^{-2}$ | $C_6$ | $1.5800 \times 10^{-3}$ | $C_8$ | $4.0404 \times 10^{-5}$ |
| $C_{10}$ | $-4.5525 \times 10^{-5}$ | $C_{11}$ | $5.7000 \times 10^{-7}$ | $C_{13}$ | $5.1879 \times 10^{-7}$ |
| $C_{15}$ | $-4.6448 \times 10^{-7}$ | $C_{17}$ | $1.0831 \times 10^{-8}$ | $C_{19}$ | $2.0907 \times 10^{-8}$ |
| $C_{21}$ | $-1.5506 \times 10^{-8}$ | | | | |

FFS[2]

| $C_4$ | $9.4786 \times 10^{-4}$ | $C_6$ | $-2.7811 \times 10^{-3}$ | $C_8$ | $2.1054 \times 10^{-5}$ |
| $C_{10}$ | $-2.8245 \times 10^{-5}$ | $C_{11}$ | $-3.6758 \times 10^{-7}$ | $C_{13}$ | $1.5044 \times 10^{-7}$ |
| $C_{15}$ | $-2.6061 \times 10^{-7}$ | $C_{17}$ | $-7.2898 \times 10^{-9}$ | $C_{19}$ | $1.2435 \times 10^{-8}$ |
| $C_{21}$ | $-4.4433 \times 10^{-8}$ | | | | |

FFS[3]

| $C_4$ | $-1.4560 \times 10^{-3}$ | $C_6$ | $-5.2630 \times 10^{-3}$ | $C_8$ | $1.1131 \times 10^{-5}$ |
| $C_{10}$ | $-8.6615 \times 10^{-5}$ | $C_{11}$ | $-1.7864 \times 10^{-6}$ | $C_{13}$ | $-5.1057 \times 10^{-8}$ |
| $C_{15}$ | $-1.5856 \times 10^{-6}$ | $C_{17}$ | $-4.2489 \times 10^{-8}$ | $C_{19}$ | $9.7969 \times 10^{-8}$ |
| $C_{21}$ | $-4.5857 \times 10^{-8}$ | | | | |

FFS[4]

| $C_4$ | $8.0528 \times 10^{-6}$ | $C_6$ | $-1.2312 \times 10^{-4}$ | $C_8$ | $6.4693 \times 10^{-6}$ |
| $C_{10}$ | $2.6746 \times 10^{-6}$ | $C_{11}$ | $1.3067 \times 10^{-8}$ | $C_{13}$ | $1.2140 \times 10^{-7}$ |
| $C_{15}$ | $-4.9692 \times 10^{-8}$ | $C_{17}$ | $-1.2786 \times 10^{-8}$ | $C_{19}$ | $-5.1320 \times 10^{-8}$ |
| $C_{21}$ | $6.7108 \times 10^{-8}$ | | | | |

Eccentricity [1]

| X | 0.00 | Y | 0.00 | Z | 0.00 |
| α | 0.00 | β | 0.00 | γ | 0.00 |

Eccentricity [2]

| X | 0.00 | Y | 0.00 | Z | 13.42 |
| α | −17.89 | β | 0.00 | γ | 0.00 |

Eccentricity [3]

| X | 0.00 | Y | −5.30 | Z | 62.09 |
| α | −28.63 | β | 0.00 | γ | 0.00 |

Eccentricity [4]

| X | 0.00 | Y | 27.51 | Z | 35.55 |
| α | −77.78 | β | 0.00 | γ | 0.00 |

Eccentricity [5]

| X | 0.00 | Y | −32.18 | Z | 20.09 |
| α | −114.52 | β | 0.00 | γ | 0.00 |

Eccentricity [6]

| X | 0.00 | Y | 26.48 | Z | 60.42 |
| α | 52.06 | β | 0.00 | γ | 0.00 |

Eccentricity [7]

| X | 0.00 | Y | 35.00 | Z | 65.90 |
| α | 45.23 | β | 0.00 | γ | 0.00 |

(Optical path 2)

| Surface number | Radius of curvature | Spacing ∞ | Eccentricity ∞ | Refractive index | Abbe constant body face |
|---|---|---|---|---|---|
| 1 | Aperture face | $d_1 = 0.00$ | Eccentricity [1] | | |
| 2 | FFS[1] | $d_2 = 0.00$ | Eccentricity [2] | $n_1 = 1.5254$ | $v_1 = 56.2$ |
| 3 | FFS[2] | $d_3 = 0.00$ | Eccentricity [3] | $n_2 = 1.5254$ | $v_2 = 56.2$ |
| 4 | FFS[3] | $d_4 = 0.00$ | Eccentricity [4] | $n_3 = 1.5254$ | $v_3 = 56.2$ |
| 5 | FFS[4] | $d_5 = 0.00$ | Eccentricity [5] | $n_4 = 1.5254$ | $v_4 = 56.2$ |
| image surface | ∞ | $d_8 = 0.00$ | Eccentricity [8] | | |

-continued

| | | Eccentricity [8] | | | | |
|---|---|---|---|---|---|---|
| X | 0.00 | Y | −88.22 | Z | 10.98 | |
| α, | 86.89 | β | 0.00 | γ | 0.00 | |

With such a prism 1, |θ2−θ1|=49.15 (°) and |θ4−θ3|=13.42 (°) and equations (1) and (2) are satisfied. Moreover, equations (6) and (7) are also satisfied.

Incident aperture diameter D and half picture angles $\phi_X$, $\phi_Y$ are as below. D=40 (mm), $\phi_X$=0.5 (°), $\phi_Y$=0.5 (°).

Paraxial focal distance $F_X$, $F_Y$, whole picture angle image height $H_X$, $H_Y$, and ratio F/D are as below.

Optical path 1: $F_X$=229.50 (mm), $F_Y$=229.05 (mm)
$H_X$=4.005 (mm), $H_Y$=3.997 (mm)
F/D=5.732

Optical path 2: $F_X$=228.84 (mm), $F_Y$=229.59 (mm)
$H_X$=4.003 (mm), $H_Y$=3.994 (mm)
F/D=5.730]

Here subscripts X and Y relate to distances in the X and Y axis directions. Moreover, these denote the rotation angle about the X and Y axes. These are similarly represented in the following examples.

Consequently, optical paths 1 and 2 both satisfy equation (3) and (4). Furthermore, equation (9) and (11) are also satisfied.

Moreover, as shown in FIG. 2, when D=40 (mm), $\phi_X$=3 (°), $\phi_Y$=3 (°), $F_X$=228.84 (mm), $F_Y$=229.59 (mm), $H_X$=24.17 (mm), $H_Y$=24.06 (mm) and F/D=5.730.

As shown above, in this example, the prism 1 can be configured with the transmission surface 3, the reflection surface 4, the reflection surface 5, the branching surface 6, and the transmission surface 7, as rotationally asymmetric surfaces.

EXAMPLE 2

Next is a description of a second numerical example of the eccentric optical system of the above described first embodiment, with reference to FIG. 3.

The configuration parameters of the optical apparatus of the second numerical example are shown hereunder. Reference symbols $r_i$ and $n_i$ (where i is an integer) shown in FIG. 3, correspond to $r_i$ and $n_i$ of the configuration parameters of the optical apparatus shown hereunder. Refractive index represents the refractive index with respect to the d beam (wavelength 587.56 nm).

Optical path 1 is the optical path of the beam reflected by the branching surface 26. Optical path 2 is the optical path of the beam transmitted through the branching surface 26.

The coordinate system and the like are the same as described for example 1.

(Optical path 1)

| Surface number | Radius of curvature ∞ | Spacing ∞ | Eccentricity ∞ | Refractive index | Abbe constant body face |
|---|---|---|---|---|---|
| 1 | Aperture face | $d_1$ = 0.00 | Eccentricity [1] | | |
| 2 | FFS[1] | $d_2$ = 0.00 | Eccentricity [2] | $n_1$ = 1.5254 | $v_1$ = 56.2 |
| 3 | FFS[2] | $d_3$ = 0.00 | Eccentricity [3] | $n_2$ = 1.5254 | $v_2$ = 56.2 |
| 4 | FFS[3] | $d_4$ = 0.00 | Eccentricity [4] | $n_3$ = 1.5254 | $v_3$ = 56.2 |
| 5 | FFS[4] | $d_5$ = 0.00 | Eccentricity [5] | $n_4$ = 1.5254 | $v_4$ = 56.2 |
| 6 | $r_6$ = 26.05 | $d_6$ = 0.00 | Eccentricity [6] | | |
| image surface | ∞ | $d_7$ = 0.00 | Eccentricity [7] | | |

FFS[1]

| $C_4$ | $1.1768 \times 10^{-2}$ | $C_6$ | $3.2380 \times 10^{-3}$ | $C_8$ | $3.9745 \times 10^{-5}$ |
| $C_{10}$ | $1.9358 \times 10^{-5}$ | $C_{11}$ | $6.9717 \times 10^{-7}$ | $C_{13}$ | $-2.5583 \times 10^{-7}$ |
| $C_{15}$ | $-6.6237 \times 10^{-7}$ | $C_{17}$ | $1.4231 \times 10^{-8}$ | $C_{19}$ | $9.6078 \times 10^{-9}$ |
| $C_{21}$ | $-8.5636 \times 10^{-10}$ | | | | |

FFS[2]

| $C_4$ | $1.7737 \times 10^{-3}$ | $C_6$ | $-2.8338 \times 10^{-3}$ | $C_8$ | $3.6677 \times 10^{-5}$ |
| $C_{10}$ | $-1.2822 \times 10^{-5}$ | $C_{11}$ | $-6.3761 \times 10^{-7}$ | $C_{13}$ | $-1.4547 \times 10^{-7}$ |
| $C_{15}$ | $-3.8695 \times 10^{-7}$ | $C_{17}$ | $-1.7742 \times 10^{-8}$ | $C_{19}$ | $-8.6154 \times 10^{-9}$ |
| $C_{21}$ | $-4.1870 \times 10^{-9}$ | | | | |

FFS[3]

| $C_4$ | $-1.2600 \times 10^{-3}$ | $C_6$ | $-7.4387 \times 10^{-3}$ | $C_8$ | $4.1848 \times 10^{-5}$ |
| $C_{10}$ | $-3.7975 \times 10^{-5}$ | $C_{11}$ | $-1.1691 \times 10^{-6}$ | $C_{13}$ | $-2.1702 \times 10^{-6}$ |
| $C_{15}$ | $-5.1633 \times 10^{-6}$ | $C_{17}$ | $-1.6348 \times 10^{-8}$ | $C_{19}$ | $-1.9428 \times 10^{-8}$ |
| $C_{21}$ | $4.1351 \times 10^{-8}$ | | | | |

FFS[4]

| $C_4$ | $-2.0744 \times 10^{-3}$ | $C_6$ | $-2.7480 \times 10^{-3}$ | $C_8$ | $1.4086 \times 10^{-5}$ |
| $C_{10}$ | $2.9285 \times 10^{-6}$ | $C_{11}$ | $5.0482 \times 10^{-6}$ | $C_{13}$ | $1.0163 \times 10^{-6}$ |
| $C_{15}$ | $-1.4497 \times 10^{-6}$ | $C_{17}$ | $3.9632 \times 10^{-7}$ | $C_{19}$ | $2.1132 \times 10^{-7}$ |
| $C_{21}$ | $7.0389 \times 10^{-8}$ | | | | |

Eccentricity [1]

| X | 0.00 | Y | 0.00 | Z | 0.00 |
| α | 0.00 | β | 0.00 | γ | 0.00 |

Eccentricity [2]

| X | 0.00 | Y | 0.00 | Z | 14.20 |
| α | −17.46 | β | 0.00 | γ | 0.00 |

Eccentricity [3]

| X | 0.00 | Y | −5.26 | Z | 63.59 |
| α | −28.70 | β | 0.00 | γ | 0.00 |

Eccentricity [4]

| X | 0.00 | Y | 25.86 | Z | 38.71 |
| α | −78.30 | β | 0.00 | γ | 0.00 |

Eccentricity [5]

| X | 0.00 | Y | −40.83 | Z | 20.43 |
| α | −134.20 | β | 0.00 | γ | 0.00 |

Eccentricity [6]

| X | 0.00 | Y | −32.22 | Z | 48.65 |
| α | 30.00 | β | 0.00 | γ | 0.00 |

Eccentricity [7]

| X | 0.00 | Y | −27.74 | Z | 74.66 |
| α | 25.00 | β | 0.00 | γ | 0.00 |

(Optical path 2)

| Surface number | Radius of curvature ∞ | Spacing ∞ | Eccentricity ∞ | Refractive index | Abbe constant body face |
|---|---|---|---|---|---|
| 1 | Aperture face | $d_1$ = 0.00 | Eccentricity [1] | | |
| 2 | FFS[1] | $d_2$ = 0.00 | Eccentricity [2] | $n_1$ = 1.5254 | $v_1$ = 56.2 |
| 3 | FFS[2] | $d_3$ = 0.00 | Eccentricity [3] | $n_2$ = 1.5254 | $v_2$ = 56.2 |

-continued

| | | | | | | |
|---|---|---|---|---|---|---|
| 4 | FFS[3] | $d_4 = 0.00$ | Eccentricity [4] | $n_3 = 1.5254$ | $v_3 = 56.2$ | |
| 5 | FFS[4] | $d_5 = 0.00$ | Eccentricity [5] | $n_4 = 1.5254$ | $v_4 = 56.2$ | |
| image surface | ∞ | $d_8 = 0.00$ | Eccentricity [8] | | | |

| Eccentricity [8] | | | | | |
|---|---|---|---|---|---|
| X | 0.00 | Y | −90.61 | Z | 23.05 |
| α | 93.45 | β | 0.00 | γ | 0.00 |

With such a prism 22, $|\theta_2-\theta_1|=49.60$ (°) and $|\theta_4-\theta_3|=15.80$ (°) and equations (1) and (2) are satisfied. Moreover, equations (6) and (7) are also satisfied.

Incident aperture diameter D and half picture angles $\phi_X$, $\phi_Y$ are as below. D=40 (mm), $\phi_X$=0.5 (°), $\phi_Y$=0.5 (°).

Paraxial focal distance $F_X$, $F_Y$, whole picture angle image height $H_X$, $H_Y$, and ratio F/D are as below.

Optical path 1: $F_X$=239.24 (mm), $F_Y$=221.36 (mm)
$H_X$=4.176 (mm), $H_Y$=3.903 (mm)
F/D=5.758

Optical path 2: $F_X$=218.09 (mm), $F_Y$=236.14 (mm)
$H_X$=3.806 (mm), $H_Y$=4.092 (mm)
F/D=5.678

Consequently, optical paths 1 and 2 both satisfy equations (3) and (4). Furthermore, equations (9) and (11) are also satisfied.

As shown above, in this example, the prism 22 can be configured with the transmission surface 23, the reflection surface 24, the reflection surface 25, and the branching surface 26, as rotationally asymmetric surfaces, and the transmission surface 27 as an eccentric spherical surface.

EXAMPLE 3

Next is a description of a third numerical example of the eccentric optical system of the above described second embodiment, with reference to FIG. 5A and FIG. 5B.

The configuration parameters of the optical apparatus of the third numerical example are shown hereunder. Reference symbols $r_i$ and $n_i$ (where i is an integer) shown in FIG. 5, correspond to $r_i$ and $n_i$ of the configuration parameters of the optical apparatus shown hereunder. Refractive index represents the refractive index with respect to the d beam (wavelength 587.56 nm).

Optical path 1 is the optical path of the beam reflected by the branching surface 14. Optical path 2 is the optical path of the beam transmitted through the branching surface 14.

The coordinate system and the like are the same as described for example 1.

(Optical path 1)

| Surface number | Radius of curvature | Spacing | Eccentricity | Refractive index | Abbe constant body face |
|---|---|---|---|---|---|
| | ∞ | ∞ | | | |
| 1 | Aperture face | $d_1 = 0.00$ | Eccentricity [1] | | |
| 2 | FFS[1] | $d_2 = 0.00$ | Eccentricity [2] | $n_1 = 1.5254$ | $v_1 = 56.2$ |
| 3 | FFS[2] | $d_3 = 0.00$ | Eccentricity [3] | $n_2 = 1.5254$ | $v_2 = 56.2$ |
| 4 | FFS[3] | $d_4 = 0.00$ | Eccentricity [4] | $n_3 = 1.5254$ | $v_3 = 56.2$ |
| 5 | FFS[4] | $d_5 = 0.00$ | Eccentricity [5] | | |
| 6 | FFS[5] | $d_6 = 0.00$ | Eccentricity [6] | | |
| image surface | ∞ | $d_7 = 0.00$ | Eccentricity [7] | | |

FFS[1]

| | | | | | |
|---|---|---|---|---|---|
| $C_4$ | $1.2009 \times 10^{-2}$ | $C_6$ | $5.1590 \times 10^{-3}$ | $C_8$ | $3.5062 \times 10^{-5}$ |
| $C_{10}$ | $-6.4558 \times 10^{-5}$ | $C_{11}$ | $9.0361 \times 10^{-7}$ | $C_{13}$ | $-2.9265 \times 10^{-7}$ |
| $C_{15}$ | $-4.5641 \times 10^{-7}$ | $C_{17}$ | $1.7009 \times 10^{-8}$ | $C_{19}$ | $3.4164 \times 10^{-8}$ |
| $C_{21}$ | $1.0394 \times 10^{-8}$ | | | | |

FFS[2]

| | | | | | |
|---|---|---|---|---|---|
| $C_4$ | $8.0565 \times 10^{-4}$ | $C_6$ | $-2.3781 \times 10^{-3}$ | $C_8$ | $2.6737 \times 10^{-5}$ |
| $C_{10}$ | $4.8088 \times 10^{-6}$ | $C_{11}$ | $-6.0483 \times 10^{-7}$ | $C_{13}$ | $-1.9035 \times 10^{-7}$ |
| $C_{15}$ | $1.2972 \times 10^{-8}$ | $C_{17}$ | $-2.0064 \times 10^{-8}$ | $C_{19}$ | $-4.6527 \times 10^{-9}$ |
| $C_{21}$ | $8.2792 \times 10^{-10}$ | | | | |

FFS[3]

| | | | | | |
|---|---|---|---|---|---|
| $C_4$ | $-2.4418 \times 10^{-3}$ | $C_6$ | $-5.8699 \times 10^{-3}$ | $C_8$ | $9.8728 \times 10^{-6}$ |
| $C_{10}$ | $1.6060 \times 10^{-5}$ | $C_{11}$ | $-3.3895 \times 10^{-6}$ | $C_{13}$ | $-3.4277 \times 10^{-6}$ |
| $C_{15}$ | $-7.4697 \times 10^{-7}$ | $C_{17}$ | $-1.0451 \times 10^{-7}$ | $C_{19}$ | $-1.1100 \times 10^{-7}$ |
| $C_{21}$ | $-3.0357 \times 10^{-8}$ | | | | |

FFS[4]

| | | | | | |
|---|---|---|---|---|---|
| $C_4$ | $9.0903 \times 10^{-5}$ | $C_6$ | $4.5278 \times 10^{-7}$ | $C_8$ | $6.7292 \times 10^{-6}$ |
| $C_{10}$ | $5.5388 \times 10^{-6}$ | $C_{11}$ | $1.3522 \times 10^{-7}$ | $C_{13}$ | $-2.7277 \times 10^{-7}$ |
| $C_{15}$ | $-3.4648 \times 10^{-8}$ | | | | |

FFS[5]

| | | | | | |
|---|---|---|---|---|---|
| C4 | $-6.0728 \times 10^{-4}$ | $C_6$ | $-5.0141 \times 10^{-4}$ | $C_8$ | $8.1619 \times 10^{-5}$ |
| $C_9$ | $2.0218 \times 10^{-4}$ | $C_{11}$ | $7.5242 \times 10^{-5}$ | $C_{13}$ | $-1.9077 \times 10^{-6}$ |
| $C_{15}$ | $3.5305 \times 10^{-6}$ | | | | |

| Eccentricity [1] | | | | | |
|---|---|---|---|---|---|
| X | 0.00 | Y | 0.00 | Z | 0.00 |
| α | 0.00 | β | 0.00 | γ | 0.00 |

| Eccentricity [2] | | | | | |
|---|---|---|---|---|---|
| X | 0.00 | Y | 0.00 | Z | 10.49 |
| α | −15.70 | β | 0.00 | γ | 0.00 |

| Eccentricity [3] | | | | | |
|---|---|---|---|---|---|
| X | 0.00 | Y | −4.12 | Z | 53.75 |
| α | −31.77 | β | 0.00 | γ | 0.00 |

| Eccentricity [4] | | | | | |
|---|---|---|---|---|---|
| X | 0.00 | Y | 26.18 | Z | 34.90 |
| α | −80.05 | β | 0.00 | γ | 0.00 |

| Eccentricity [5] | | | | | |
|---|---|---|---|---|---|
| X | 0.00 | Y | −33.82 | Z | 22.14 |
| α | −109.30 | β | 0.00 | γ | 0.00 |

| Eccentricity [6] | | | | | |
|---|---|---|---|---|---|
| X | 0.00 | Y | 24.40 | Z | 50.96 |
| α | −119.25 | β | 0.00 | γ | 0.00 |

| Eccentricity [7] | | | | | |
|---|---|---|---|---|---|
| X | 0.00 | Y | 30.90 | Z | 54.35 |
| α | 67.24 | β | 0.00 | γ | 0.00 |

(Optical path 2)

| Surface number | Radius of curvature | Spacing | Eccentricity | Refractive index | Abbe constant body face |
|---|---|---|---|---|---|
| | ∞ | ∞ | | | |
| 1 | Aperture face | $d_1 = 0.00$ | Eccentricity [1] | | |
| 2 | FFS[1] | $d_2 = 0.00$ | Eccentricity [2] | $n_1 = 1.5254$ | $v_1 = 56.2$ |

-continued

| 3 | FFS[2] | $d_3 = 0.00$ | Eccentricity [3] | $n_2 = 1.5254$ | $v_2 = 56.2$ |
|---|---|---|---|---|---|
| 4 | FFS[3] | $d_4 = 0.00$ | Eccentricity [4] | $n_3 = 1.5254$ | $v_3 = 56.2$ |
| 5 | FFS[4] | $d_8 = 0.00$ | Eccentricity [5] | | |
| 8 | ∞ (mirror face) | $d_8 = 0.00$ | Eccentricity [8] | | |
| 9 | FFS[6] | $d_9 = 0.00$ | Eccentricity [9] | | |
| 10 | ∞ (mirror face) | $d_{10} = 0.00$ | Eccentricity [10] | | |
| 11 | FFS[7] | $d_{11} = 0.00$ | Eccentricity [11] | | |
| image surface | ∞ | $d_{12} = 0.00$ | Eccentricity [12] | | |

FFS[6]

| $C_4$ | $2.7942 \times 10^{-2}$ | $C_6$ | $1.6729 \times 10^{-2}$ | $C_8$ | $3.1642 \times 10^{-4}$ |
| $C_{10}$ | $-2.8669 \times 10^{-4}$ | $C_{11}$ | $9.2135 \times 10^{-5}$ | $C_{13}$ | $-7.8717 \times 10^{-4}$ |
| $C_{15}$ | $-1.7387 \times 10^{-5}$ | | | | |

FFS[7]

| $C_4$ | $3.9719 \times 10^{-2}$ | $C_6$ | $3.3782 \times 10^{-2}$ | $C_8$ | $-7.2471 \times 10^{-4}$ |
| $C_{10}$ | $-5.6703 \times 10^{-4}$ | $C_{11}$ | $4.6858 \times 10^{-5}$ | $C_{13}$ | $1.2169 \times 10^{-4}$ |
| $C_{15}$ | $2.9809 \times 10^{-5}$ | | | | |

Eccentricity [8]

| X | 0.00 | Y | −41.74 | Z | 21.00 |
| α | 37.20 | β | 0.00 | γ | 0.00 |

Eccentricity [9]

| X | 0.00 | Y | −48.00 | Z | 69.10 |
| α | 132.72 | β | 0.00 | γ | 0.00 |

Eccentricity [10]

| X | 0.00 | Y | −35.24 | Z | 68.46 |
| α | −75.88 | β | 0.00 | γ | 0.00 |

Eccentricity [11]

| X | 0.00 | Y | −46.31 | Z | 73.71 |
| α | 92.63 | β | 0.00 | γ | 0.00 |

Eccentricity [12]

| X | 0.00 | Y | −38.80 | Z | 76.46 |
| α | 74.88 | β | 0.00 | γ | 0.00 |

With such a prism 10, $|\theta_2 - \theta_1| = 48.28$ (°) and $|\theta_4 - \theta_3| = 9.949$ (°) and equations (1) and (2) are satisfied. Moreover, equations (6) and (7) are also satisfied.

Incident aperture diameter D and half picture angles $\phi_X$, $\phi_Y$ are as below. D=40 (mm), $\phi_X$=0.5 (°), $\phi_Y$=0.5 (°).

Paraxial focal distance $F_X$, $F_Y$, whole picture angle image height $H_X$, $H_Y$, and ratio F/D of the optical path 1 corresponding to FIG. 5A are as below.

Optical path 1: $F_X$=229.19 (mm), $F_Y$=229.30 (mm)

$H_X$=4.000 (mm), $H_Y$=4.002 (mm)

F/D=5.731

Consequently, equations (3) and (4) are satisfied. Furthermore, equations (9) and (11) are also satisfied. The calculated values for the optical path 2 side are not shown, however, the construction is such that equations (3) and (4) and also (9) and (11) are similarly satisfied.

As shown above, in this example, the prism 10 being the eccentric optical system, can be configured with the transmission surface 11, the reflection surface 12, the reflection surface 13, the branching surface 14, and the transmission surface 15, as rotationally asymmetric surfaces.

On the optical path 2 is provided the collimator reflection surface 18 and the concave reflection surface 20 being light-condensing devices, as the rotationally asymmetric surfaces, and by positioning the reflection surface 17 and the rotating reflection surface 19, an eccentric system can be configured which condenses the transmission light of the branching surface 14 onto the image surface 21.

In the description of the first and second examples, the example was given for where, in the eccentric optical system the fourth surface was a branching surface. However, in the case where two different optical paths are not required, or the optical path is branched after output from the fourth surface or the fifth surface to form a plurality of optical paths, then the fourth surface need not be a branching surface. Alternatively, this may be a branching surface, with only one of the reflected light or the transmitted light being used.

With the fourth surface as the reflection surface, only the light beam emitted from the fifth surface is used, and with the fourth surface as a transmission surface, the light beam emitted from the fourth surface may be used. In these cases, the coating of the fourth surface may adopt either a low transmission reflective coating, or a low reflection coating (AR coating).

In the description for the first and second embodiments, the example was explained where the reflective coating for controlling the reflection factor with respect to the incident light inside the fourth surface was formed as a half mirror coating. However another coating may be adopted for the branching surface of the fourth surface.

For example, forming a polarized beam splitting (PBS) coating, to perform branching corresponding to the polarization condition of the light beam which reaches the fourth surface is possible. By changing the PBS coating corresponding to the polarization condition up until the input light reaches the fourth surface, the branched light quantity ratio can be adjusted. Furthermore, if necessary, an optical device such as a suitable polarizer which polarizes the polarization may be arranged at a suitable position.

Furthermore, for example forming a dichroic beam splitter coating, to perform branching corresponding to the wavelength of the beam which reaches the fourth surface is possible.

In the description for the aforementioned second embodiment, the example was explained where a condensing device was provided on the transmission optical path side. However, depending on circumstances for the arrangement of the apparatus, the condensing device may be arranged on the reflection side of the optical path. In this case, due to the surface form of the fourth surface, the optical path length on the reflection side of the optical path is long, so that adjustment can be made for ease of provision of the condensing device.

In the description of the aforementioned first through third embodiments, the example was explained where two image surfaces were formed outside the prism. However, a branching surface may be provided on the optical path outside the prism to branch into a plurality of optical paths, and a plurality of image surfaces thus provided. If this is done, a photodetector or position detection device may be arranged on the respective image surfaces. Therefore, there is the advantage that these outputs can be used, and high accuracy position detection can be performed.

In the description of the aforementioned third embodiment, the example was explained where the control unit 41, the input signal control unit 42, and the deflection control device 32a were inside the light-condensing unit 60. However, needless to say these may be arranged apart from the light-condensing unit 60.

Moreover, the drive control device 44d may be arranged on the support 44c or arranged separately. Furthermore, this may be arranged inside the light-condensing unit 60.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

A first aspect of an eccentric optical system of the present invention having an approximately parallel input light beam, and including a prism having a medium with a refractive index of one or more, on which at least four optical operating surfaces are formed at the boundary surface of the medium, wherein assuming the optical operating surfaces are referred to as a firs; second, third, fourth, . . . , and n-th ("n" is a natural number) surface along an optical path of the input light, at least one surface of the first through fourth surfaces is a branching surface wherein the optical path is branched into two optical paths for transmitted light and reflected light.

According to the first aspect of an eccentric optical system, the five optical operating surfaces formed on the boundary surface of the medium are positioned in a positional relationship so that the primary light beam reflected by the third surface towards the fourth surface on the axis, and the primary light beam reflected by the fourth surface towards the fifth surface on the axis, each intersect the primary light beam transmitted through the first surface towards the second surface on the axis. Therefore, the primary light beam from the second surface towards the third surface on the axis intersects the primary light beam from the fourth surface towards the fifth surface on the axis.

In order to realize such an optical path, the optical operating surfaces must be positioned on the periphery of the prism, for example, first surface, fourth surface, second surface, fifth surface, and third surface, in that order. Moreover, at least adjacent optical operating surfaces are positioned either eccentrically or inclined in the form of a prism forming an eccentric optical system.

Consequently, since vignetting of the light beam in coaxial catoptric systems such as the Cassegrain type does not occur, light loss due to such vignetting can be prevented.

Furthermore, since such optical paths fold again one part of the optical path wherein the light beams intersect in a triangular shape within the prism, the configuration can be more compact than the eccentric optical system employing a conventional prism.

Moreover, since the refractive index of the prism medium is one or more, the power of the reflection surface is multiplied by the refractive index and becomes comparatively large. Therefore, the curvature of each optical operating surface can be reduced, thus controlling the amount of aberration occurring, and a satisfactory imaging performance can be provided.

Furthermore, since the five optical operating surfaces are integrated as boundary surfaces of the prism medium, positioning can be both accurate and very easily achieved, and without the trouble of adjusting and positioning the optical axis of each optical operating surface during assembly as is the case with an eccentric optical system combining a plurality of reflective mirrors.

Moreover, since at least two of the five optical operating surfaces are rotationally asymmetric surfaces, particularly when the primary light beam on the axis passing through the center of the incident aperture of the eccentric optical system and reaching the center of the image formation surface is eccentrically incident on the eccentric optical system, it is possible to compensate for eccentric aberrations such as trapezoidal distortion of the image, and inclination of the image, and the like occurring due to the eccentricity.

In the present specification, the term "optical operating surface" refers to a surface such as a physical surface or boundary surface of a medium having been processed appropriately, and having the macro-scale optical effects of reflection, refraction, interference, and polarization and the like on light beams. That is, it refers generically to planar optical elements, for example, reflection surfaces, transparent surfaces, refractive surfaces, lens surfaces, fresnel lens surfaces, prism surfaces, polarizing surfaces, optical surfaces and the like as is the case in this industry. When counting optical operating surfaces, therefore, micro-scale optical effects such as the multiple interfaces between layers in coatings and the like are not counted.

A second aspect of an eccentric optical system of the present invention having an approximately parallel input light beam, and including a prism having a medium with a refractive index of one or more, on which five optical operating surfaces are formed at the boundary surface of the medium, wherein the five optical operating surfaces are positioned so that, assuming the five optical operating surfaces are referred to as a first, second, third, fourth, and fifth surface in that order along the optical path of the input light, at least one surface of the first through fifth surfaces is a branching surface wherein the optical path is branched into two optical paths for transmitted light and reflected light, and a true image is formed in each of the optical paths branched at the branching surface.

According to the second aspect of an eccentric optical system, since the optical path can be branched into two optical paths and images formed, one is compensated for aberration by at least four optical operating surfaces, while the other is compensated for aberration by a combination of five optical operating surfaces, and a high performance branched image formation system can therefore be formed in each optical path.

According to the first or the second aspect of an eccentric optical system, in an optical system wherein input light being an approximately parallel light beam incident with a field angle is condensed onto at least one light receiving surface by using a prism having five optical operating surfaces provided eccentrically or at an incline, with two of these optical operating surfaces rotationally asymmetric surfaces, there is the effect that it is possible to obtain an eccentric optical system wherein light loss up to the point at which the input light reaches the light receiving surface is reduced, wherein miniaturization can be achieved even with a comparatively long focal distance, and furthermore, the light forming an image on the light receiving surface is of high resolution.

In the second aspect of an eccentric optical system, the first surface may be a transmission surface which transmits the input light, the second surface and the third surface may be internal reflection surfaces which reflect the light beam passing inside the medium inside the medium, the fourth surface may be a branching surface which branches the optical path into two optical paths of transmitted light and reflected light, the fifth surface may be a transmission surface which transmits the reflected light reflected by the fourth surface, and at least two surfaces of these five optical operating surfaces may be rotationally asymmetric surfaces, and at least one true image may be formed outside the prism.

In this case, the input light incident from the first surface is reflected in turn by the second and third surfaces, and reaches the fourth surface. On one optical path, the light is reflected by the fourth surface towards the fifth surface, transmitted through the fifth surface, and emitted from the prism. Furthermore, on the other optical path, the light is transmitted through the fourth surface and emitted from the prism. A true image is then formed with the emitted light from one of the optical paths.

Since the optical path is formed in this manner, the five optical operating surfaces are eccentric or inclined, and an eccentric optical system positioned so as to surrounded the medium is necessary.

Consequently, since vignetting of the light beam does not occur as in coaxial catoptric systems, light loss due to such vignetting can be prevented.

Furthermore, since the input light is reflected and folded two or three times within the medium having a reflective index of one or more before it is emitted, an optical apparatus compact in comparison with the length of the optical path is possible. Moreover, the power of the reflection surface is multiplied by the refractive index of the medium and becomes comparatively large, and the amount of aberration for each optical operating surface can therefore be controlled, and a satisfactory imaging performance can be provided.

Furthermore, since the five optical operating surfaces are integrated as boundary surfaces of the prism medium, positioning can be both accurate and comparatively easily achieved, and without the trouble of adjusting and positioning the optical axis of each optical operating surface during assembly as is the case with an eccentric optical system combining a plurality of reflective mirrors.

Moreover, since at least two of the five optical operating surfaces are rotationally asymmetric surfaces, particularly when the primary light beam on the axis passing through the center of the incident aperture of the eccentric optical system and reaching the center of the image formation surface is eccentrically incident on the eccentric optical system, it is possible to compensate for eccentric aberrations such as trapezoidal distortion of the image, and inclination of the image, and the like occurring due to the eccentricity.

In the first aspect of an eccentric optical system, the second surface may include a rotationally asymmetric surface having a positive power.

In this case, the input light incident on the first surface as an approximately parallel light beam is reflected by the rotationally asymmetric surfaces having positive power and provided eccentrically in the second surface having a comparatively large diameter light beam. Consequently, by employing rotationally asymmetric surfaces having superior ability to compensate for aberration, aberration compensation load in the following stage is reduced, and an optical apparatus with satisfactory imaging performance can be configured.

In the first aspect of an eccentric optical system, the third surface may include a rotationally asymmetric surface having a negative power.

In this case, since the third surface has negative power, the spherical aberration and coma aberration occurring on the first surface can be compensated. Furthermore, since the Petzval sum can be improved for the off-axis light beam, this acts effectively, particularly when the field angle of the incident light is large, and hence imaging performance can be improved.

Moreover, since it is formed from rotationally asymmetric surfaces, eccentric aberration can be satisfactorily compensated.

Furthermore, by combining with a constitution provided with a rotationally asymmetric surface having a positive power, the second surface can be made positive, and the third surface can be made negative, thus forming a telescopic lens-type optical apparatus, the distance to the image position can be reduced in relation to the focal distance, and a miniaturized prism can be realized.

In the first aspect of an eccentric optical system, an optical path may be formed wherein the primary light beam on the axis of the reflected light reflected by the branching surface intersects with the primary light beam on the axes of at least two light beams passing through the prism.

In this case, since the optical path of the light reflected from the branching surface intersects with the optical path of at least two light beams passing through the prism, and is folded so that it overlaps, it can be of compact configuration making effective use of the medium space within the prism.

In the second aspect of an eccentric optical system, an optical path may be formed wherein the primary light beam reflected by the second surface towards the third surface on the axis, and the primary light beam reflected by the fourth surface towards the fifth surface on the axis, each intersect the primary light beam transmitted through the first surface towards the second surface on the axis.

In this case, the primary light beam transmitted through the first surface towards the second surface on the axis intersects the primary light beam reflected by the third surface towards the fourth surface on the axis, and the primary light beam reflected by the fourth surface towards the fifth surface on the axis, and is folded so that it overlaps. It can therefore be of compact configuration making effective use of the medium space within the prism.

In the second aspect of an eccentric optical system, an arrangement of the first through fifth surfaces in the peripheral direction of the prism may be such that at least one surface between the first surface and the second surface, between the second surface and the third surface, between the third surface and the fourth surface, and between the fourth surface and the fifth surface, is provided with another optical operating surface.

In this case, since two primary light beams are formed on the axis intersecting the primary light beam from the nth surface to the (n+1)th surface (n=1, 2, 3, 4) on the axis, and the primary light beams on the axis between another two optical operating surfaces, more of the same space within the prism is employed effectively, and the medium space can be of compact configuration.

In the second aspect of an eccentric optical system, when, with a plane orthogonal to the primary light beam on the axis of the input light as an inclined datum surface, the angle of inclination of a tangential plane at a position intersecting the primary light beam on the axis on the second surface is $\theta 1$, and the angle of inclination of a tangential plane at a position intersecting the primary light beam on the axis on the third surface is $\theta 2$, the following conditional expression may be satisfied:

$$30° \leq |\theta 2 - \theta 1| \leq 80°$$

In this case, when the tangential plane at the intersection of the primary light beam on the axis and the surface is defined as the surface for measuring the angle of inclination of the optical operating surface, the angle of inclination $|\theta 2 - \theta 1|$ of the surface wherein the second surface and third surface intersect is within the range of the conditional expression. On the other hand, in terns of geometry, this angle of inclination provides either the sum or the difference of the incident angle of the second surface and the incident angle of the third surface, of the primary light beam on the axis.

Therefore, when the angle of inclination |θ2−θ1| exceeds the upper limit of 80°, the incident angle of the second surface or third surface becomes too large. Particularly when these eccentric surfaces have power, coma aberration also occurs in the light beam on the axis. Furthermore, even if rotationally asymmetric surfaces are employed as the second surface or third surface to compensate for this aberration, the asymmetry becomes too large and removal of coma aberration of the off-axis light beam becomes difficult.

Moreover, when the angle of inclination |θ2−θ1| becomes less than the lower limit of 30°, positioning to avoid vignetting is difficult.

In order to ensure higher performance of the eccentric optical system, preferably the range of the angle of inclination |θ2−θ1| is narrower than the aforementioned range. In practice, preferably $$35° \leq |θ2-θ1| \leq 70°,$$

and more preferably $$40° \leq |θ2-θ1| \leq 60°.$$

In the second aspect of an eccentric optical system, when, with a plane orthogonal to the primary light beam on the axis of the input light as an inclined datum surface, the angle of inclination of a tangential plane at a position intersecting the primary light beam on the axis on the fourth surface is θ3, and the angle of inclination of a tangential plane at a position intersecting the primary light beam on the axis on the fifth surface is θ4, the following conditional expression is satisfied:

$$|θ4-θ3| \leq 30°$$

In this case, the angle of inclination |θ4−θ3| of the surface wherein the fourth surface and fifth surface intersect is within the range of the aforementioned conditional expression.

Therefore, the present conditional expression requires that the degree of parallel of the fourth surface, and the fifth surface, being the surface emitting the emitted light onto the image surface in a single optical path, is within a range of between 0° and 30°. As a result, the inclination of the image surface in the focal plane can be small, and a small and high performance eccentric optical system can be provided.

When the angle of inclination |θ4−θ3| exceeds the upper limit of 30° and becomes large, the light reflected from the fourth surface towards the fifth surface is significantly refracted at the fifth surface, resulting in off-axis aberration. Furthermore, since the image surface in the focal plane is significantly inclined, the light receiving surface receiving the light forming the image must be separated from the prism, and an apparatus employing this eccentric optical system becomes large.

In order to ensure higher performance of the eccentric optical system, preferably the range of the angle of inclination |θ4−θ3| is narrower than the aforementioned range. In practice, preferably $$|θ4-θ3| \leq 20°.$$

In the first aspect of an eccentric optical system, when a paraxial focal distance is assumed as F, the following conditional expression may be satisfied:

$$60(mm) \leq F \leq 500(mm)$$

In this case, restriction of the range of the paraxial focal distance F allows manufacture of the eccentric optical system within a rational range, and the system can therefore be miniaturized and low-cost.

That is, when the paraxial focal distance F exceeds the upper limit of 500 mm and is long, even if a medium having a refractive index of one or more, and folding of the optical path, are employed, the prism becomes larger as the degree of difficulty of manufacture increases. Moreover, when the paraxial focal distance F is shorter than the lower limit of 60 mm, the benefits of folding of the optical path cannot be sufficiently realized. Therefore, by adopting the value of this distance this problem can be reliably avoided, and miniaturization and low-cost can be within a rational range.

In order to ensure the dramatic benefits of compactness and low-cost, preferably the range of the length of the paraxial focal distance F is narrower than the aforementioned range. In practice, preferably $$80(mm) \leq F \leq 400(mm),$$

and more preferably $$100(mm) \leq F \leq 300(mm).$$

In the first aspect of an eccentric optical system, when a paraxial focal distance is assumed as F, and an incident aperture diameter is assumed as D, a ratio F/D satisfies the following conditional expression:

$$2 \leq F/D \leq 15$$

In this case, since the range of the ratio F/D of the paraxial focal distance F and the incident aperture diameter D is within the range of the conditional expression, the format of the eccentric optical system can be balanced.

That is, when the ratio F/D exceeds the upper limit of 15 and is large, the length of the optical path in relation to the incident aperture diameter becomes too long, and either the prism, or the back-focus, of the optical apparatus become large, and a compact optical apparatus becomes impossible. Furthermore, when the ratio is less than the lower limit of 2, the diameter of the incident light beam becomes large in relation to the focal distance, resulting in the NA becoming large, and spherical aberration and coma aberration and the like increase, and aberration compensation becomes difficult. Therefore, by adopting the value in between, these problems can be avoided, and the format of the eccentric optical system can be balanced In order to ensure greater compactness and higher performance of the eccentric optical system, preferably the range of the ratio F/D is narrower than the aforementioned range. In practice, preferably $$3 \leq F/D \leq 10,$$

and more preferably $$4 \leq F/D \leq 8.$$

In the first aspect of an eccentric optical system, there may be provided an optical device which forms a light beam after formation of a true image outside the prism, into an approximately parallel light beam, and has a positive power which forms an emitting aperture at a required position.

In this case, in addition to the action of the eccentric optical system, since the emitted light after formation of a true image of the eccentric optical system is formed into an approximately parallel light beam by the optical device having positive power, forming an emitting aperture at the required position, the position of the emitting aperture is assumed as the aperture of the observer, and a virtual image enlarged by the eccentric optical system is observed, that is, it can be employed as a telescopic lens.

Moreover, since the emitting aperture is formed at the required position, when an optical device such as a reflective mirror or the like is positioned at that position, since the light beam remains within the limits of the emitting aperture, a compact optical device can be provided even if the incident field angle of the input light is changed.

Furthermore, there may be provided a light-condensing device which images the light beam after formation of the emitting aperture, onto the light receiving surface.

In this case, in the eccentric optical system according to the thirteenth aspect there is provided a light-condensing device which images the light beam after formation of the emitting aperture, onto the light receiving surface.

According to this aspect of the invention, since the light-condensing device which images the light beam after formation of the emitting aperture, onto the light receiving surface is provided, condensing of the light beam can be adjusted to suit the area of the light receiving surface, and the light can be received without light loss and with high efficiency.

In the first aspect of an eccentric optical system, of the five optical operating surfaces, at least one surface is a branching surface wherein the optical path is branched into two optical paths for transmitted light and reflected light, and a true image is formed in each of the optical paths branched at the branching surface.

In this case, since the input light is branched into two optical paths at the branching surface, and a true image can be formed for each optical path, a high performance and compact branched image formation system can be formed.

In the second aspect of an eccentric optical system, assuming the five optical operating surfaces are referred to as the fist, second, third, fourth, and fifth surfaces along the optical path of the input light, the branching surface may be provided as the fourth surface, and a primary light beam reflected by the fourth surface towards the fifth surface on the axis may form an optical path intersecting with a primary light beam transmitted through the first surface towards the second surface on the axis, and a primary light beam reflected by the second surface towards the third surface on the axis.

In this case, since the branching surface is provided at the fourth surface, the reflected light is subject to the optical effects of the first, second, third, fourth, and fifth surfaces, and since the transmitted light is subjected to the optical effects of the first, second, third, and fourth surfaces, aberration is compensated with the first, second, third, and fourth surfaces with transmitted light as well, and a satisfactory imaging performance can be provided.

Furthermore, the primary light beam reflected by the fourth surface towards the fifth surface on the axis intersects, the primary light beam transmitted through the first surface towards the second surface on the axis, and the primary light beam reflected by the second surface towards the third surface on the axis, and is folded so that it overlaps. Therefore it can be of compact configuration making effective use of the medium space within the prism.

By combining with the configuration in the first aspect, in particular, three points of intersection of the optical axes occur, and it can therefore be of compact configuration making more effective use of the space.

An optical apparatus of the present invention wherein the input light is an approximately parallel light beam, including: a light-condensing unit having the eccentric optical system, and a light-deflecting device which deflects a light beam forming the emitting aperture in the eccentric optical system, in the vicinity of the position of the emitting aperture, and guides it to a single one of the light receiving surfaces; a position detection device which detects a light receiving position of the light beam guided to one light receiving surface and outputs a detection signal; a movement mechanism which movably holds the light-condensing unit; and a position control device which controls the amount of movement of the movement mechanism in response to the detection output from the position detection device, or an amount of deflection of the light-deflecting device, or both.

According to the optical apparatus, since the light beam forming the emitting aperture is deflected with the light-deflecting device and guided to one of the light receiving surfaces, the light beam can be guided to the appropriate position of the light receiving surface, even when the incident field angle of the input light in relation to the eccentric optical system provided in the light-condensing unit is changed. Therefore, the amount of movement of the movement mechanism can be controlled in response to detection output of the position detection device, or the amount of deflection of the light-deflecting device, or both. Hence, the attitude in which the light-condensing unit is positioned can be controlled so that the incident field angle of the input light is held constant, and can be maintained in this status.

According to the optical system of the present invention, by using the eccentric optical system according to the present invention, there is the effect that an optical system wherein highly accurate and highly efficient optical tracking is possible can be constructed.

The movement mechanism may be provided with a gimbal stage.

In this case, since the gimbal stage is provided, the attitude in which the light-condensing unit is positioned can be tracked to the input light even if the incident field angle of the input light changes in two axes.

An actual aperture of the eccentric optical system may be integrated with an exterior of the light-condensing unit.

In this case, since the actual aperture of the eccentric optical system is integrated with the exterior of the light-condensing unit, an aperture member can be omitted.

The position detection device may be provided in one light receiving surfaces, and in another light receiving surfaces, and the position control device may provides coarse movement of the movement mechanism in response to one detection output from the position detection device, and fine movement of the movement mechanism in response to another detection output of the position detection device.

In this case, since coarse movement and fine movement of the light-condensing unit are possible, highly accurate control of position is possible for a wide range of incident field angles.

The position detection device may be provided with a modulating photodetector device which constitutes a light receiving part in transmission of optical signals through space.

In this case, a light receiving part in transmission of optical signals through space which provides a similar operational effect to the optical apparatus is possible.

What is claimed is:

1. An eccentric optical system having an approximately parallel input light beam, and comprising a prism having a medium with a refractive index of one or more, on which at least four optical operating surfaces are formed at the boundary surface of the medium, wherein assuming the optical operating surfaces are referred to as a first, second, third, fourth, . . . , and n-th ("n" is a natural number) surface along an optical path of the input light, at least one surface of the first through fourth surfaces is a branching surface wherein the optical path is branched into two optical paths for transmitted light and reflected light, and wherein an optical path is formed wherein the primary light beam on the axis of the reflected light reflected by the branching surface intersects with the primary light beam on the axes of at least two light beams passing through the prism.

2. An eccentric optical system having an approximately parallel input light beam, and comprising a prism having a medium with a refractive index of one or more, on which five optical operating surfaces are formed at the boundary surface of the medium, wherein, assuming the five optical operating surfaces are referred to as a first, second, third, fourth, and fifth surface along the optical path of the input light, at least one surface of the first through fifth surfaces is a branching surface wherein the optical path is branched into two optical paths for transmitted light and reflected light, and a true image is formed in each of the optical paths branched at the branching surfaced wherein an optical path is formed wherein the primary light beam reflected by the second surface towards the third surface on the axis and the primary light beam reflected by the fourth surface towards the fifth surface on the axis, each intersect the primary light beam transmitted through the first surface towards the second surface on the axis.

3. The eccentric optical system according to claim 2, wherein the first surface is a transmission surface which transmits the input light, the second surface and the third surface are internal reflection surfaces which reflect the light beam passing inside the medium inside the medium, the fourth surface is the branching surface which branches the optical path into two of the optical paths of transmitted light and reflected light, the fifth surface is a transmission surface which transmits the reflected light reflected by the fourth surface, and at least two surfaces of these five optical operating surfaces are rotationally asymmetric surfaces, and at least one true image is formed outside the prism.

4. The eccentric optical system according to claim 1, wherein the second surface comprises a rotationally asymmetric surface having a positive power.

5. The eccentric optical system according to claim 1, wherein the third surface comprises a rotationally asymmetric surface having a negative power.

6. The eccentric optical system according to claim 2, wherein an arrangement of the first through fifth surfaces in the peripheral direction of the prism is such that at least one surface between the first surface and the second surface, between the second surface and the third surface, between the third surface and the fourth surface, and between the fourth surface and the fifth surface, is provided with another optical operating surface.

7. The eccentric optical system according to claim 2, wherein when, with a plane orthogonal to the primary light beam on the axis of the input light as an inclined datum surface, the angle of inclination of a tangential plane at a position intersecting the primary light beam on the axis on the second surface is θ1, and the angle of inclination of a tangential plane at a position intersecting the primary light beam on the axis on the third surface is θ2, the following conditional expression is satisfied:

$$30° \leq |θ2-θ1| \leq 80°.$$

8. The eccentric optical system according to claim 2, wherein when, with a plane orthogonal to the primary light beam on the axis of the input light as an inclined datum surface, the angle of inclination of a tangential plane at a position intersecting the primary light beam on the axis on the fourth surface is θ3, and the angle of inclination of a tangential plane at a position intersecting the primary light beam on the axis on the fifth surface is θ4, the following conditional expression is satisfied:

$$|θ4-θ3| \leq 30°.$$

9. The eccentric optical system according to claim 1, wherein when a paraxial focal distance is assumed as F, the following conditional expression is satisfied:

$$60(\text{mm}) \leq F \leq 500(\text{mm}).$$

10. The eccentric optical system according to claim 1, wherein when a paraxial focal distance is assumed as F, and an incident aperture diameter is assumed as D, a ratio F/D satisfies the following conditional expression:

$$2 \leq F/D \leq 5.$$

11. The eccentric optical system according to claim 1, wherein there is provided an optical device which forms a light beam after formation of a true image outside the prism, into an approximately parallel light beam, and has a positive power which forms an emitting aperture at a required position.

12. The eccentric optical system according to claim 11, wherein there is provided a light-condensing device which images the light beam after formation of the emitting aperture, onto a plight receiving surface.

13. The eccentric optical system according to claim 1, wherein the prism comprises four optical operating surfaces, and wherein of the four optical operating surfaces, at least one surface is the branching surface wherein the optical path is branched into two of the optical paths for transmitted light and reflected light, and a true image is formed in each of the optical paths branched at the branching surface.

14. An optical apparatus wherein the input light is an approximately parallel light beam, comprising:

a light-condensing unit having an eccentric optical system according to claim 11, and a light-deflecting device which deflects a light beam forming the emitting aperture in the eccentric optical system, in the vicinity of the position of the emitting aperture, and guides it to one of light receiving surfaces;

a position detection device which detects a light receiving position of the light beam guided to the one of light receiving surface and outputs a detection signal;

a movement mechanism which movably holds the light-condensing unit; and a position control device which controls the amount of movement of the movement mechanism in response to the detection output from the position detection device, or an amount of deflection of the light-deflecting device, or both.

15. The optical apparatus according to claim 14, wherein the movement mechanism is provided with a gimbal stage.

16. The optical apparatus according to claim 14, wherein an actual aperture of the eccentric optical system is integrated with an exterior of the light-condensing unit.

17. The optical apparatus according to claim 14,
wherein the position detection device is provided in one of the light receiving surfaces, and in another of the light receiving surfaces, and
the position control device provides coarse movement of the movement mechanism in response to one detection output from the position detection device, and fine movement of the movement mechanism in response to another detection output of the position detection device.

18. The optical apparatus according to claim 14, wherein the position detection device is provided with a modulating photodetector device which constitutes a light receiving part in transmission of optical signals through space.

19. An optical apparatus for special optical communications, comprising a photodetector positioned at a position of an image of the eccentric optical system according to claim 1.

20. An eccentric optical system having an approximately parallel input light beam, and comprising a prism having a medium with a refractive index of one or more, on which five optical operating surfaces are formed at the boundary surface of the medium, wherein, assuming the five optical operating surfaces are referred to as a first, second, third, fourth, and fifth surface along the optical path of the input light, at least one surface of the first through fifth surfaces is a branching surface wherein the optical path is branched into two optical paths for transmitted light and reflected light, and a true image is formed in each of the optical paths branched at the branching surface, and wherein assuming the five optical operating surfaces are referred to as the first, second, third, fourth, and fifth surfaces along the optical path of the input light, the branching surface is provided as the fourth surface, and a primary light beam reflected by the fourth intersecting with a primary light beam transmitted through the first surface towards the second surface on the axis, and a primary light beam reflected by the second surface towards the third surface on the axis.

* * * * *